United States Patent [19]

Isoguchi et al.

[11] Patent Number: 4,963,985
[45] Date of Patent: Oct. 16, 1990

[54] VIDEO CAMERA USING INTERPOLATING FOCUS CONTROL

[75] Inventors: Seiichi Isoguchi; Yoshio Murai; Jun Takayama; Katsuya Nagaishi, all of Hachioji, Japan

[73] Assignee: Konica Corporation, Tokyo, Japan

[21] Appl. No.: 465,598

[22] Filed: Jan. 19, 1990

Related U.S. Application Data

[60] Continuation of Ser. No. 281,080, Dec. 8, 1988, abandoned, which is a division of Ser. No. 159,933, Feb. 24, 1988, abandoned.

[30] Foreign Application Priority Data

| Feb. 25, 1987 | [JP] | Japan | 62-44028 |
| Mar. 6, 1987 | [JP] | Japan | 62-51488 |
| Mar. 6, 1987 | [JP] | Japan | 62-51489 |
| Apr. 20, 1987 | [JP] | Japan | 62-97914 |
| Apr. 24, 1987 | [JP] | Japan | 62-101533 |
| May 13, 1987 | [JP] | Japan | 62-117637 |
| May 13, 1987 | [JP] | Japan | 62-117638 |
| May 13, 1987 | [JP] | Japan | 62-117639 |

[51] Int. Cl.⁵ .......................... H04N 5/38; H04N 3/26
[52] U.S. Cl. ..................................... 358/227; 358/909
[58] Field of Search ............. 358/227, 213.19, 213.13, 358/909; 354/400

[56] References Cited

U.S. PATENT DOCUMENTS

| 4,320,417 | 3/1982 | Hanma et al. | 358/227 |
| 4,422,097 | 12/1983 | Inuiya | 358/227 |
| 4,611,244 | 9/1986 | Hanma et al. | 358/227 |
| 4,717,959 | 1/1988 | Isago | 358/227 |

Primary Examiner—Stephen Brinich
Attorney, Agent, or Firm—Finnegan, Henderson, Farabow, Garrett, and Dunner

[57] ABSTRACT

A still video camera includes a solid-state image pickup device including a photosensor section, a vertical transfer section for vertically transferring charge from the photosensor section, and a horizontal transfer section for outputting the charge from the vertical transfer section to the outside. The solid-state image pickup device is arranged to change an exposure time. Exposure is started at an end of transfer of the charge from the photosensor section to the vertical transfer section. Emission of an electronic flash is started on the basis of a predetermined shutter speed when a predetermined period of time has elapsed. The charge of the photosensor section in the solid-state image pickup device is transferred to the vertical transfer section when an amount of light reflected by an object to be photographed reaches a predetermined value, thereby completing the exposure.

4 Claims, 20 Drawing Sheets

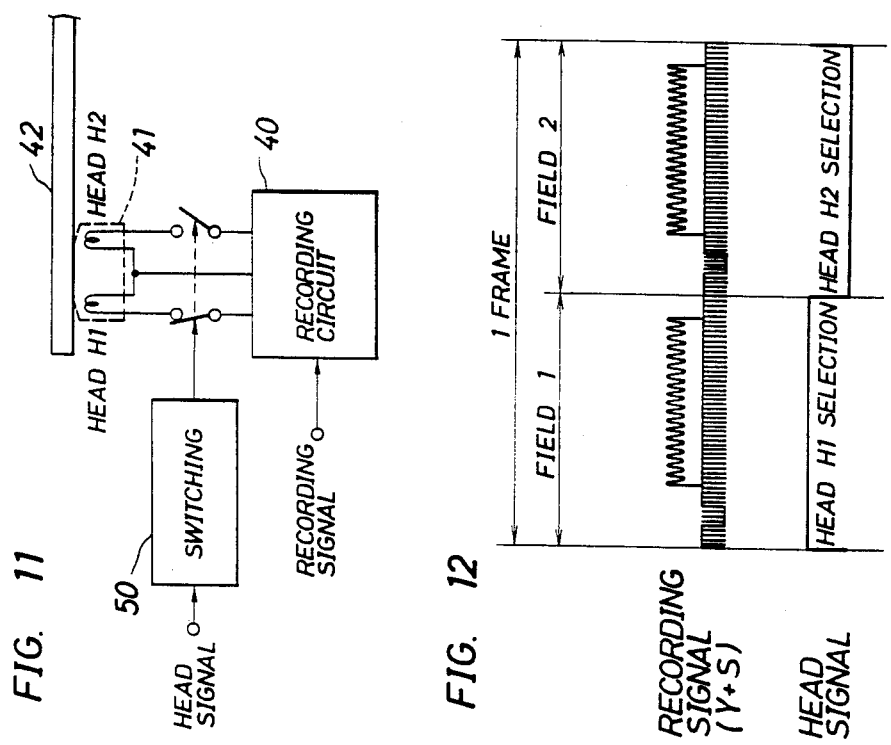

FIG. 24(a) VIDEO SIGNAL
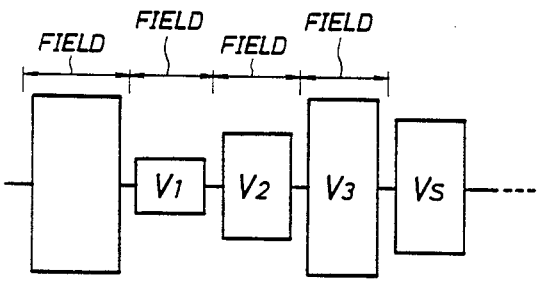
FIG. 24(b) SHUTTER TIME
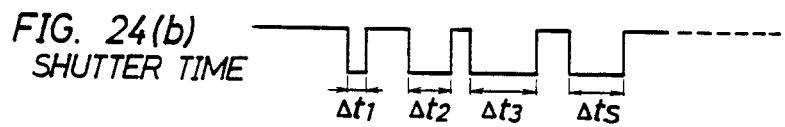
FIG. 24(c) INTEGRATOR OUTPUT
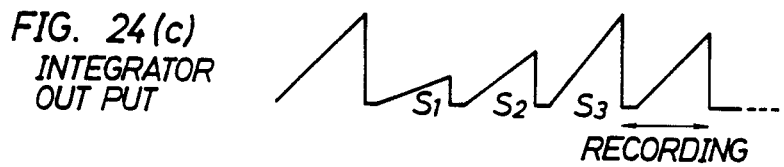
FIG. 25
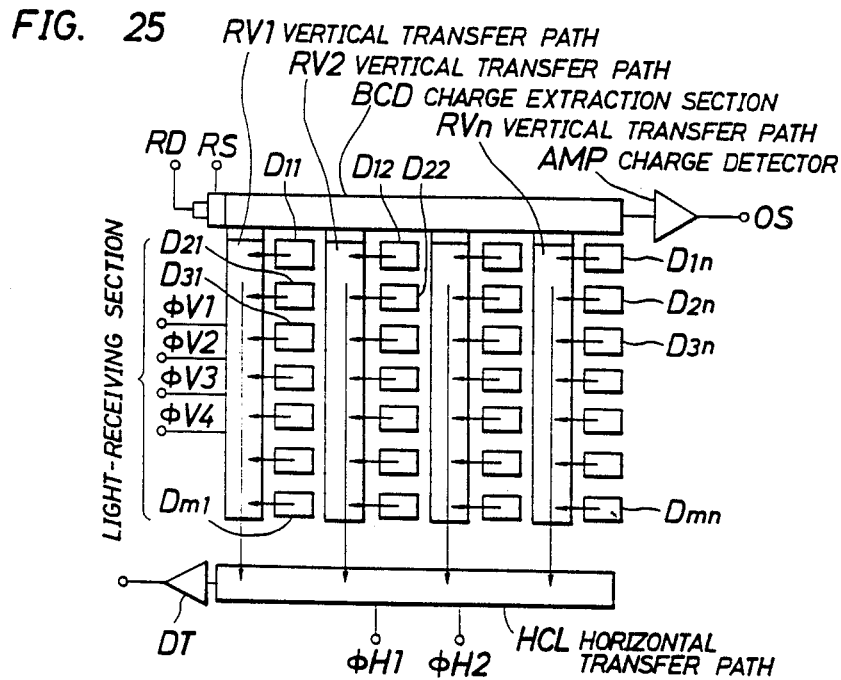

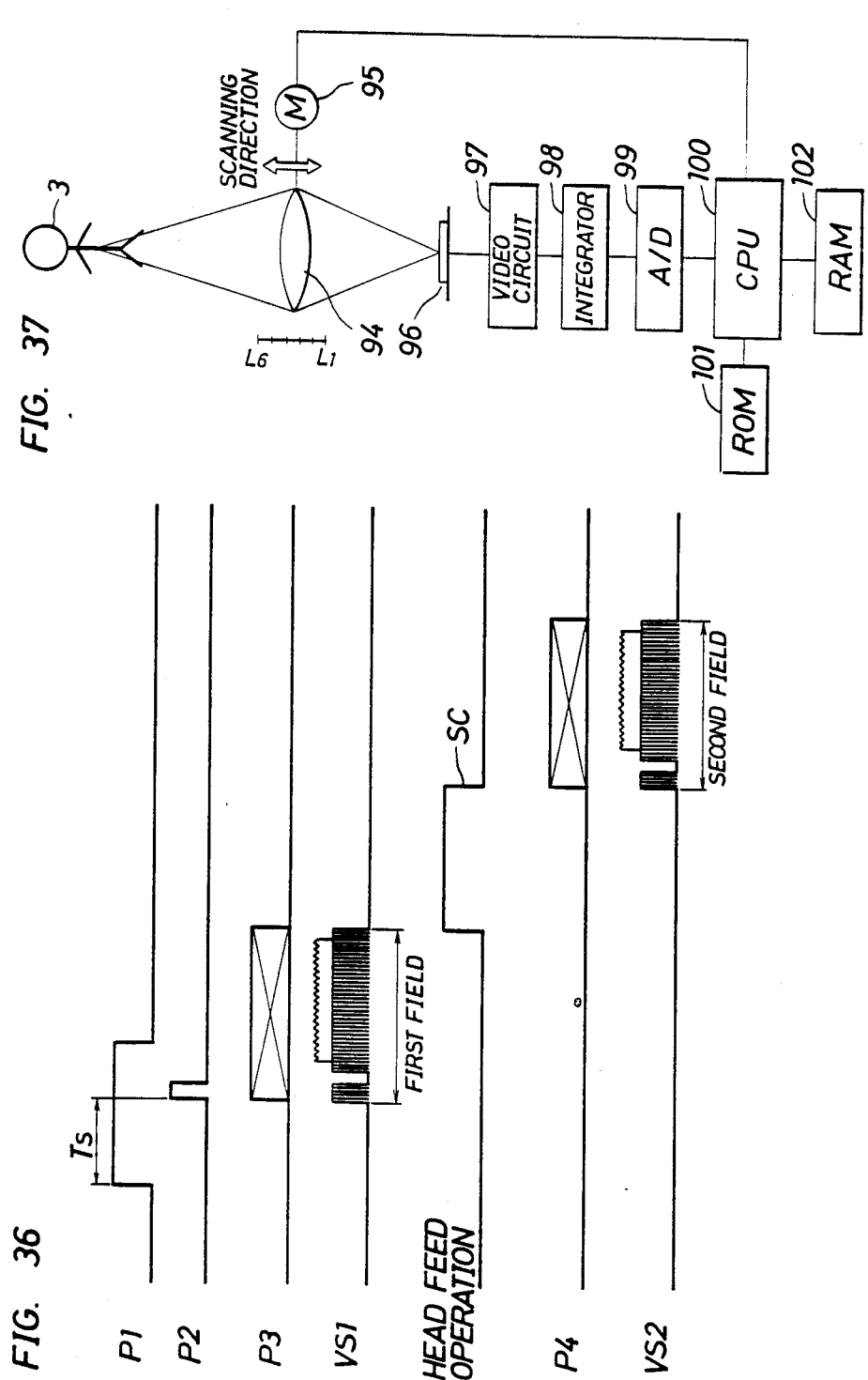

4,963,985

VIDEO CAMERA USING INTERPOLATING FOCUS CONTROL

This application is a continuation of application Ser. No. 281,080, filed Dec. 8, 1988, now abandoned, which was a division of Ser. No. 159,933, filed Feb. 24, 1988, now abandoned.

BACKGROUND OF THE INVENTION

1. Field of the Invention

The present invention relates to a still video camera and, more particularly, to a still video camera including an automatic focus control apparatus.

2. Description of the Prior Art

A still video camera is a camera using a solid-state image pickup device (e.g., a CCD) as a light-receiving element to store image information as an electrical signal in an information recording medium such as a magnetic disk. In a conventional camera of this type, development of a film is not required since a silver chloride film is not used. In addition, image information can be transferred to a remote area. Therefore, the still video camera has received a great deal of attention in favor of a variety of image processing operations. Most of solid-state image pickup devices used in still video cameras in an initial stage of their development are primarily developed for VTR cameras. Mechanical shutters such as a focal plane shutter are required When an object is photographed with an electronic flash by a still video camera of this type, an exposure amount must be controlled with high precision due to the following reason. When a solid-state image pickup device is a CCD, slight underexposure with respect to an optimal exposure amount causes excessive whitening of a bright portion of an image, and slight overexposure causes excessive blackening of its dark portion. In a conventional silver chloride film, even if an actual exposure amount is deviated from the optimal exposure amount, an error can be corrected during development and printing In a conventional still camera using a silver chloride film, a distance between the camera and the object is measured by auto focusing (automatic focusing control) in accordance with the following formula Guide Number = Distance × F-number The f-number is then calculated by the above formula, and exposure control can be relatively easily performed (so-called "flashmatic" control) In addition, the distance can be set in one of the steps between ∞ (infinite) and 1 m.

In a conventional still video camera using a CCD as a light-receiving element, optimal exposure control cannot be performed due to the narrow latitude range of the CCD. In the still video camera, exposure must be controlled with high precision. For example, a light control electronic flash is used to control the emission amount of the electronic flash.

FIG. 1 is a diagram showing an exposure control system of a conventional still video camera. When a trigger (emission start signal) is input to a light emission controller 1, the controller 1 operates an electronic flash 2. Upon operation of the electronic flash 2, an object 3 is illuminated with light from the electronic flash 2. Light reflected by the object 3 is incident on a light-receiving element 5 through a light-receiving lens 4. An integrator 6 integrates a photoelectric conversion output from the light-receiving element 5 simultaneously when the electronic flash 2 emits light. When an output from the integrator 6 reaches a light control level determined by CCD sensitivity and a selected f-number, a comparator 7 supplies a stop signal to the light emission controller 1. Therefore, the emission operation of the electronic flash 2 is stopped by the light emission controller 1.

FIG. 2 is a graph showing conversion characteristics of the electronic flash emission amount. Referring to FIG. 2, the electronic flash emission amount is plotted along the ordinate, and time t is plotted along the abscissa. A trigger is applied at time t1, and the electronic flash emission amount is abruptly increased, as is apparent from FIG. 2. When an integrated value of the integrator 6 reaches a light control level at time ts, the emission from the electronic flash 2 is stopped. An area indicated by hatched lines is an actual emission amount. A dotted curve is an emission curve of the electronic flash in a full emission state If the emission amount in the full emission state is zero at time t2, t2 can reach after ts in a duration between time t1 and time t2. A duration between time ts and time t2 is set to be a predetermined time interval (e.g., 1/60 second) in accordance with a given type of camera. The duration between time t1 and time t2 is a maximum integration time of the integrator 6.

A Xenon tube is used as an electronic flash. As shown in FIG. 2, when emission of the electronic flash 2 is interrupted during its emission period, the circuit arrangement of the light emission controller 1 is extremely complicated. A time error occurs between the generation of the emission stop signal and the end of actual emission For this reason, it is difficult to turn off the electronic flash with high precision during emission It is extremely difficult to turn off the electronic flash with high precision during the initial period of its operation. As a result, even if an automatic light control electronic flash is used in an electronic flash photographing mode wherein the distance is the closest focusing distance in a full-aperture state, the resultant image is degraded by underexposure and is often whitened In addition, a complicated circuit arrangement is required to result in a bulky system at high cost.

A solid-state image pickup device (frame-interline CCD or FIT-CCD) was recently developed. The FIT-CCD comprises a photosensor section, a vertical transfer section for vertically transferring an output from the photosensor section, and a memory for storing an output from the vertical transfer section FIG. 3 is a block diagram of the FIT-CCD. Referring to FIG. 3, reference numeral 10 denotes a photosensor section for converting an image signal into an electrical signal; 11, a vertical transfer section for vertically transferring the electrical signal from the photosensor section 10; and 12, a memory for storing an electrical signal (charge) transferred from the vertical transfer section 11. An output from the memory 12 is output through a horizontal transfer section 13.

The photosensor section 10 generates charge corresponding to input image information and supplies the charge to the vertical transfer section 11. The vertical transfer section 11 temporarily holds the charge supplied from the photosensor section 10 and transfers the held charge to the memory 12 in response to a shift clock. The memory 12 stores analog charge transferred from the vertical transfer section 11. The charge corresponding to the image information and transferred to the vertical transfer section 11 is no longer influenced by external light. The image information at the time of transfer is stored in the memory 12. In this sense, the FIT-CCD shown in FIG. 3 has an electronic shutter function An exposure amount of the FIT-CCD is controlled by changing timings of shift pulses for transferring the charge from the photosensor section 10 to the vertical transfer section 11. When such a characteristic of the FIT-CCD is properly utilized, light control during electronic flash operation of the still video camera can be performed.

The FIT-CCD was recently developed as a solid-state image pickup device, as described above. An electronic shutter function can be realized by using this FIT-CCD. The electronic shutter function will be described below.

FIG. 4 shows an arrangement of the FIT-CCD. Referring to FIG. 4, reference numerals 10a to 10d denote photosensor sections which are vertically aligned to generate changes in accordance with the amounts of received light. Each photosensor section is constituted by four photosensors. Sixteen photosensors L11 to L44 constituting the photosensor sections 10a to 10d are arranged to form a 4×4 matrix. Reference numerals 11a to 11d denote vertical transfer CCDs for receiving the charges from the corresponding photosensor sections and transferring the charges in the vertical direction Reference numeral 14 denotes a charge extraction drain for extracting the charges of the vertical transfer CCDs 11a to 11d. Reference numeral 15a denotes a first field storage section for storing the charge of the first field transferred from the vertical transfer CCDs 11a to 11d; and 15b, a second field storage section for storing the charge of the second field transferred from the vertical transfer CCDs 11a to 11d.

An image obtained from the photosensors L11 to L14 and L31 to L34 of the first and third rows (odd-numbered rows) is given as an image of the first field, and an image obtained from the photosensors L21 to L24 and L41 to L44 of the second and fourth rows (even-numbered rows) is given as an image of the second field The images of the first and second fields constitute a one-frame image.

Reference numeral 16 denotes a horizontal transfer CCD for horizontally transferring the charges stored in the first field storage section 15a and the second field storage section 15b and outputting them outside the storage sections 15a and 15b. Reference symbols $\phi V1$ to $\phi V4$ denote vertical register clocks; $\phi V5$ to $\phi V8$, storage register clocks for transferring the charges stored in the first and second field storage sections 15a and 15b to the horizontal transfer CCD 16; and $\phi H1$ to $\phi H4$, horizontal register clocks for horizontally outputting the charge from the horizontal transfer CCD 16. Reference symbol RS denotes a reset gate; OG, an output gate; RD, a reset drain; and OS, an output transistor source. Reference symbols OD1 and OD2 denote output transistor drains.

The operation of the FIT-CCD having the arrangement described above will be generally described below. The charges remaining in the photosensors L11 to L44 and the vertical transfer CCDs 11a to 11d are extracted to the charge extraction drain 14 and are initialized The initialized state corresponds to an open state of the electronic shutter. Light reflected by an object (not shown) is incident on the photosensors L11 to L44 of the photosensor sections 10a to 10d, and the photosensors L11 to L44 generate charges corresponding to the incident light beams. The charges generated by photosensors L11 to L44 are transferred to the corresponding vertical transfer CCDs in response to shift clocks when a predetermined period of time has elapsed. When the charges are transferred from the photosensors L11 to L44 to the vertical transfer CCDs 11a to 11d, changes stored in the vertical transfer CCDs are no longer changed. This state corresponds to the closed state of the electronic shutter.

The charges stored in the vertical transfer CCDs 11a to 11d are shifted in response to shift clocks $\phi V1$ to $\phi V4$ and are stored in the first and second field storage sections 15a and 15b. More specifically, of charges stored in the photosensors L11 to L44, the charges of the photosensors of the first and third rows are stored in the first field storage section 15a, and the charges of the photosensors of the second and fourth rows are stored in the second field storage section 15b. The charges stored in the first and second field storage sections 15a and 15b are transferred to the horizontal transfer CCD 16 in response to the shift clocks $\phi V5$ to $\phi V8$. The charges are then output from the horizontal transfer CCD 16 to the outside of the CCD 16 in response to the shift clocks $\phi H1$ and $\phi H2$.

The frame photographing operation using the FIT-CCD will be described in detail with a timing chart of FIG. 5. Referring to FIG. 5, A represents the operation of the portion constituting the first field of the first and third rows, and B represents the operation of the portion constituting the second field of the second and fourth rows. Time is plotted along the abscissa.

Unnecessary charges of the vertical transfer CCDs 11a to 11d are extracted to the charge extraction drain 14 for a duration between time t0 and time t1. The unnecessary charges of the photosensors of the odd-numbered rows (i.e., photosensors (L1j and L3j where j=1 to 4) constituting the first field)) are transferred to the charge extraction drain 14 through the vertical transfer CCDs (the hatched region of A in FIG. 5) for a duration between time t1 and time t2. At the end of this charge transfer, i.e., at time t2, the exposure of the photosensors of the odd-numbered rows is started. In other words, time t2 is an electronic shutter open time. Similarly, the unnecessary charges of the photosensors of the even-numbered rows (i.e., the photosensors (L2j and L4j where j=1 to 4)) are transferred to the charge extraction drain 14 through the vertical transfer CCDs for a duration between time t2 and time t3 (the hatched region of B in FIG. 5). At the end of this charge transfer, i.e., at time t3, the exposure of the photosensors of the even-numbered rows is started. In other words, time t3 is an electronic shutter open time. The above operation corresponds to resetting of the photosensors.

When an exposure time $t_{EXP} = t4 - t2 = t5 - t3$ determined by brightness of the object has elapsed, the signal charges of the photosensors of the odd-numbered rows are instantaneously transferred to the vertical transfer CCDs 11a to 11d at time t4 (electronic shutter closing operation). The charges are transferred to the first field storage section 15a for a duration between time t4 and time t5. The signal changes of the even-numbered photosensors are instantaneously transferred to the vertical transfer CCDs 11a to 11d (electronic shutter closing operation). These charges are transferred to the second field storage section 15b for a duration between time t5 and time t6. Therefore, the signal charges of the odd-numbered photosensors are stored in the first field storage section 15a and the signal charges of the even-numbered photosensors are stored in the second field storage section 15b. The signal charges stored in the first and second field storage sections 15a and 15b are read out row by row by using the horizontal transfer CCD 16 as needed. The readout signals are recorded in, e.g., a 2" floppy disk.

When such an FIT-CCD is used as an image pickup element, exposure control during emission of the electronic flash can be performed. More specifically, when a predetermined period of time has elapsed after the electronic shutter is opened, emission of the electronic flash is started. The emission of the electronic flash is completed, light reflected by the object is received by the light-receiving element and is integrated. When the integrated value of the reflected light (i.e., an exposure amount) reaches a given value, the electronic shutter is closed while emission of the electronic flash continues.

As described above, in frame photographing in the electronic shutter operation using the FIT-CCD in normal exposure, the exposure timings are alternately different in adjacent rows. However, in the normal exposure mode, the exposure time $t_{EXP}$ is sufficiently long as compared with the charge transfer durations (i.e., t1 to t2 and t2 to t3). Exposure timing errors do not present serious problems.

However, electronic flash frame photographing using an FIT-CCD poses a problem. For example, when emission of the electronic flash is started at time t2, the radiation intervals of the electronic flash on the photosensors of the odd- and even-numbered rows differ from each other. Since the electronic flash emission time is a maximum of about 1 ms, the exposure timing error causes a difference between the exposure amounts. When the image is reproduced later, the difference appears as flickering. In other words, the image flickers.

FIG. 6 is a diagram showing a conventional still video camera using a CCD. Light from an object (not shown) is photoelectrically converted by a light-receiving element into an electrical signal. The electrical signal is amplified by an amplifier 21, and the amplified signal is supplied to a photometric circuit 22. The photometric circuit 22 measures a brightness level of the object in accordance with an output from the amplifier and supplies an object brightness signal to a system control circuit 23 The system control circuit 23 calculates an exposure amount and an f-number in accordance with the brightness of the object.

When the exposure amount and the f-number are calculated, the system control circuit 23 controls an aperture 25' to obtain an optimal aperture state At the same time, the system control circuit 23 controls an output timing of a timing generator 24 to control a shutter speed of a CCD camera unit 25. If the CCD camera unit 25 is constituted by an interline CCD, the time interval between the start of exposure of the light-receiving section and start of the transfer of the charge to the vertical transfer section is defined as the shutter time. If the shutter time is prolonged, the exposure amount is increased However, if the shutter time is shortened, the exposure amount is decreased.

An image signal received in the CCD camera unit 25 as described above is sent to a recording circuit 26. Color separation and luminance signal processing of the image signal are performed in the recording circuit 26. The processed image signal is then FM-modulated, and the FM-modulated signal is recorded in a magnetic disk 27. The magnetic disk 27 is rotated by a motor 29. The motor 29 is driven by a servo motor driver 28 under the control of the system control circuit 23. Therefore, the image is recorded in a predetermined area.

In the conventional camera as described above, the light-receiving element 20, the amplifier 21, and the photometric circuit 22 are required to measure the brightness of the object. Since the photometric light-receiving element and the like are required in the conventional camera, the camera becomes bulky and expensive. The photometric light-receiving element 20 must have the same characteristics as those of the CCD in the CCD camera unit 25. However, it is very difficult to obtain identical characteristics. For this reason, a photometric error occurs, and high-precision photometric operations cannot be performed.

Along with the unceasing advance of semiconductor techniques, various types of image processing apparatuses (e.g., a still camera and a video camera) using solid-state image pickup devices have been commercially available. In order to perform automatic exposure control in these apparatuses or automatically control exposure by driving an auto iris assembly, photometric information is inevitably required.

In a conventional still video camera, a photometric photosensor is arranged in addition to the solid-state image pickup device. An output from the photometric photosensor is used as photometric information.

In a conventional video camera, an output from the image pickup device is used. The outputs are integrated within a predetermined period of time, and the resultant voltage level is used as photometric information In the still video camera, however, the additional or photometric photosensor complicates the arrangement. In addition, the mounting position of such a photosensor must be taken into consideration.

In an arrangement wherein the outputs from the image pickup device are integrated within a predetermined period of time and the voltage level of the integrated value is used as photometric information, this operation is effective when the image pickup device is continuously operated as in a video camera. However, in a still video camera, the image pickup device is intermittently driven, the above method is ineffective due to the following reason. When the auto iris assembly is driven to control the exposure, incident light controlled by the auto iris assembly is received by the image pickup device. Outputs from the image pickup device are integrated. If the integration level is not suitable, a correction value is fed back to the auto iris assembly to control the light amount again. It takes a long time to obtain a steady state. In addition, power consumption is undesirably increased.

It is possible to drive the image pickup device at high speed and its output serves as photometric information. In this case, an HCCD drive clock must have a frequency of about several tens MHz, thus requiring sophisticated circuit techniques. In addition, it is difficult to limit a photometric area, and power consumption is undesirably increased.

FIG. 7 is a diagram showing a conventional video camera using a solid-state image pickup device such as a CCD. Image information obtained by a CCD camera unit 25 is output to a signal processor 30 in response to timing pulses (transfer pulses) output from a timing generator 24. The signal processor 30 converts the input signal into a video signal of, e.g., an NTSC scheme.

The video signal output from the signal processor 30 can be monitored by an electric viewfinder (to be referred to as an EVF hereinafter) 31. When a switch SW (normally a release switch) is turned on to instruct the start of recording, the system controller 32 supplies control signals to the timing generator 24 and the signal processor 30 to cause them to perform the above-mentioned operations.

In the conventional video camera, images of two fields (one field is 1/60 second) constitute an image of one frame, i.e., 1/30 second, and a video signal representing a one-frame image is output, as shown in FIG. 8A. In other words, only the video mode can be set in the video camera. In order to obtain a still image in such a video camera, after the release button is depressed, as shown in FIG. 8B, a time lag is caused until the photographing signal shown in FIG. 8C rises. In other words, exposure is performed for a predetermined time interval after the release button is depressed. During this time interval, the shutter is opened and is then closed when an actual exposure amount reaches a predetermined exposure amount. Meanwhile, an image stored in the CCD is recorded.

In this case, the video output is not synchronized with the release button operation. Photographing must be started after an image is established in the video output, and a time lag is caused. If a still mode is set such that photographing is immediately started upon depression of the release button, a video signal is not output. A television display cannot be performed, and hence an EVF display cannot be undesirably performed.

FIG. 9 is a block diagram of a conventional still video camera using a CCD as an image pickup device. A CCD camera unit 25 outputs an image signal corresponding to an object in response to a timing pulse supplied from a timing generator 24 through a driver 33. Reference symbol $\phi V$ denotes a charge transfer pulse; and $\phi H$, a signal read pulse. This image signal is input to and sampled and held by a sample/hold circuit 34. The sample/hold circuit 34 outputs a video signal. The output video signal is modulated by a recording circuit (not shown) The modulated signal is recorded in the magnetic disk.

An output from the sample/hold circuit 34 is also supplied to an A/D converter 35 and is converted into digital data. The digital data is stored in a semiconductor memory 37. In this case, since the access time of the semiconductor memory 37 is generally very long, the following implementation is required That is, the semiconductor memory 37 is divided into a plurality of blocks by a gate array 38. Read/write access of the image data is performed in units of blocks. More specifically, a latch section 36 is connected to the input of the semiconductor memory 37. The latch section 36 has latches corresponding to the number of memory blocks The outputs from the A/D converters 35 are sequentially latched in response to latch pulses from the gate array 38 and are written in the corresponding memory blocks.

Since the image data is output in synchronism with a read pulse $\phi H$ from the CCD camera unit 25, the image data must be written in the semiconductor memory 37 within the period of $\phi H$. As shown in FIG. 8, in order to eliminate a difference between the H timing and the data write timing of the semiconductor memory 37, as shown in FIGS. 8B and 8C, timing control of the memory must be performed by the latch section 36 and the timing control gate array 38

FIG. 10 is a diagram showing the main part of such a still video camera. Referring to FIG. 10, reference numeral 40 denotes a recording circuit comprising an FM modulator 40a for FM-modulating the image signal (recording signal) from an image pickup means (not shown) and a recording amplifier 40b. Reference numeral 41 denotes a magnetic head assembly for recording a recording signal from the recording amplifier 40b in a magnetic sheet (e.g., a magnetic disk) 42 as a recording medium or reading out the recorded signal from the magnetic sheet 42. Reference numeral 43 denotes a servo control system comprising a head feed driver 43a for feeding the magnetic head assembly 41 to a predetermined position on the magnetic sheet 42, a driver 43b for a magnetic sheet rotation motor 44, and a servo controller 43c for controlling the drivers 43a and 43b. Reference numeral 45 denotes a detector (FG coil) for detecting rotation of the motor 44. Reference numeral 46 denotes a detector (PG coil) for detecting the center of the PG yoke in the magnetic sheet 42. Signals from the detectors 45 and 46 are supplied to the servo controller 43c. The servo controller 43c controls such that the speed of the magnetic sheet 42 is kept constant The servo controller 43c also controls a rotational phase of the magnetic sheet 42. Reference numeral 47 denotes a reproducing amplifier for amplifying an output read out by the magnetic head assembly 41; 48, an RF detector for RF-detecting an output from the reproducing amplifier 47; and 49, a system controller and clock generator.

FIG. 11 is a view for explaining a conventional recording circuit section in the still video camera. The magnetic head assembly 41 comprises a first head H1 and a second head H2. When frame recording is performed, the heads H1 and H2 are switched by a head switching circuit 50 such that field 1 is recorded by the head H1 in the magnetic sheet 42 and the head H2 records field 2 therein FIG. 12 is a timing chart showing the recording signal from the image pickup means and the switching states of the heads H1 and H2.

In the conventional still video camera described above, as shown in FIG. 12, the head H1 is selected to record field 1, and the head H2 is selected to record field 2. In this manner, the two heads must be used to perform one-frame recording.

In the image pickup system (e.g., a still video camera and a video camera) using an image pickup tube or a solid-state image pickup device (e.g., CCD) as an image pickup means, the object must be photographed in an n-focus state Assume that a black-and-white fringe pattern shown in FIG. 13A is photographed. An output level of the image pickup means in the in-focus state is decreased in the black area but is increased in the white area. As shown in FIG. 13B, the black and white areas correspond to the lower and upper peaks of a sinusoidal wave, respectively However, when the object is in the out-of-focus state, the upper and lower peaks respectively corresponding to the white and black areas are not conspicuous, as shown in FIG. 13C.

Judging from the above result, when automatic focusing (auto focus) is performed, the lens position is determined such that the amplitude of the high-frequency component is maximum, as shown in FIG. 13B. One of the automatic focusing techniques is a so-called "climbing" technique.

FIG. 14 is a view for explaining the operation according to the "climbing" technique. Referring to FIG. 14, the integrated values of the high-frequency components throughout one frame are plotted along the ordinate, and the distances from ∞ (infinite) to the closest focusing distance are plotted along the abscissa. According to the "climbing" technique, the lens is driven from a position near the ∞ position to a given point, e.g., $L_i$. At the point $L_i$, the lens is driven by a small distance Δlin in the forward and reverse directions, and a change in integrated value of the high-frequency component is detected. If the integrated value of the high-frequency component at the point $L_i$ is larger than that at a point near the infinite position, and if the integrated value of the high-frequency component at the point $L_i$ is smaller than that at a point near the closest focusing point, the peak of the integrated value is located closer to the closest focusing distance point with respect to the point $L_i$. The above operations are repeated at a point $L_{i+1}$ spaced apart from the point $L_i$ by a predetermined distance. The repetition of the above operations allows detection of a point $L_f$ at which the integrated value is the largest The point $L_f$ is defined as an in-focus point. Note that the scanning direction may be a direction from the closest focusing distance to the infinite. The above "climbing" technique is used in a video camera or the like.

Another automatic focusing control technique utilizes the principle of trigonometrical survey in which the lens is scanned from the closest focusing distance to the infinite (or vice versa) to obtain a phase difference.

In a system such as a video camera in which video signals are constantly output, if the object distance is changed, the lens is moved to always obtain the in-focus state. Therefore, a technique for scanning the lens from the closest focusing distance to the infinite distance to obtain an in-focus position cannot be employed. Therefore, the "climbing" technique must be employed instead. The lens is slightly moved in the forward and reverse directions and the peak is detected in accordance with the lens driving direction and the change in high-frequency component. For this reason, if two peaks, i.e., high and low peaks as shown in FIG. 15 are present, the low peak ($L_1$) is erroneously detected as the in-focus point although the high peak ($L_2$) is present. In the phase comparison technique utilizing the principle of triangulation, a movable member such as a movable mirror in addition to the lens is required to result in an expensive, complicated system.

The "climbing" technique in which the peak of the high-frequency component of the video signal is detected to determine the in-focus point is a good auto focus technique except for some objects (e.g., a wall) without contrast. According to the "climbing" technique, when the lens is scanned from the closest focusing distance to the infinite distance, the lens can be accurately set in the in-focus position. In the still video camera, the in-focus state need not be always obtained unlike the video camera. In other words, the in-focus state must be obtained in the still video camera during only photographing. In addition, since the lens is moved for focusing, an additional mechanism is not required for scanning.

SUMMARY OF THE INVENTION

It is an object of the present invention to provide a simple still video camera capable of performing automatic focusing control

BRIEF DESCRIPTION OF THE DRAWINGS

FIG. 11 is a schematic diagram showing a circuit arrangement of a frame recording circuit in a conventional still video camera in an image recording/reproducing system;

FIG. 12 is a timing chart for explaining the operation of the frame recording circuit shown in FIG. 11;

FIG. 13A to 13C are views for explaining video signal characteristics of a black-and-white pattern in the still video camera.

FIGS. 24A to 24C are timing charts for explaining the operations of the main parts in the still video camera shown 23;

FIG. 25 is a schematic diagram of a still video camera according to still another embodiment of the present invention;

FIG. 36 is a timing chart showing the operations of a control means in the still video camera shown in FIG. 34;

FIG. 37 is a schematic diagram showing a still video camera according to still another embodiment of the present invention;

DETAILED DESCRIPTION OF THE PREFERRED EMBODIMENTS

Preferred embodiments according to the present invention will be described in detail with reference to the accompanying drawings.

Figure 1:
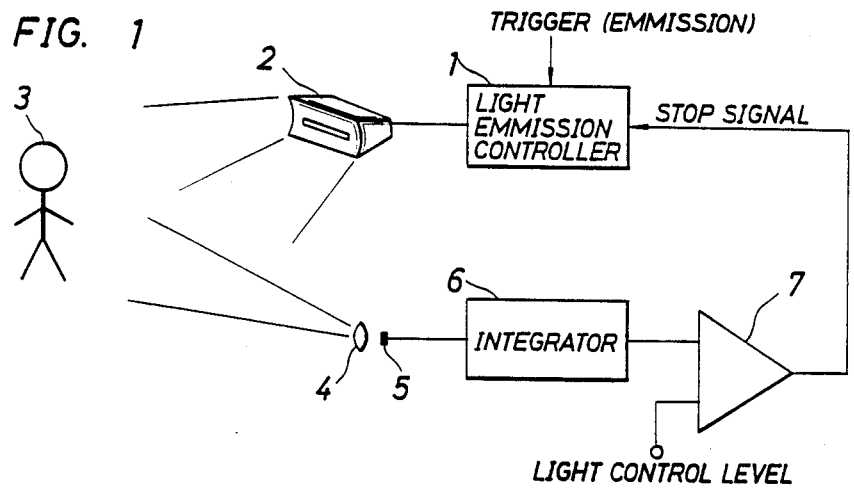
FIG. 1 is a block diagram of an exposure control system in a conventional still video camera.
Figure 16:
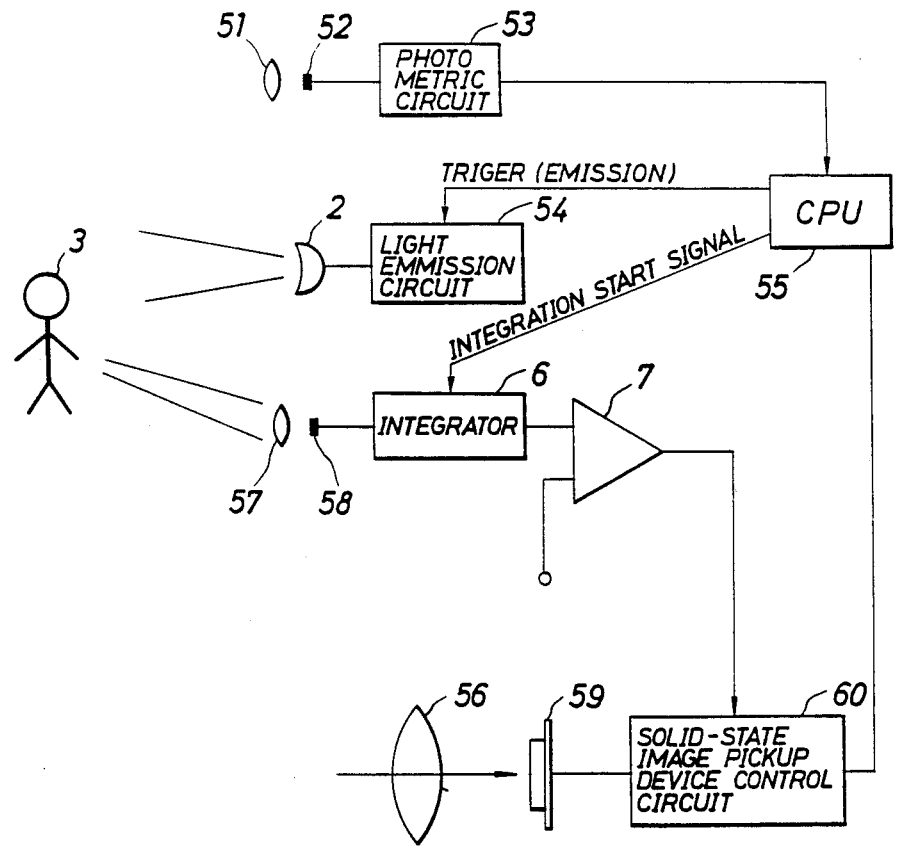
FIG. 16 is a schematic diagram showing a still video camera according to an embodiment of the present invention.

FIG. 16 shows a still video camera according to an embodiment of the present invention. The same reference numerals as in FIG. 1 denote the same parts in FIG. 16. Referring to FIG. 16, reference numeral 51 denotes a normal photometric light-receiving lens; 52, a normal photometric light-receiving element; 53, a photometric circuit for measuring luminance in accordance with a photoelectric output from the normal photometric light-receiving element 52; 55, a CPU for determining an aperture value (or f-number) and a time value (or shutter speed) in accordance with a signal from the photometric circuit 53 and outputting a control signal to various circuits; 54, a light emission circuit for receiving a trigger signal (emission start signal) from the CPU 55 and causing an electronic flash 2 to emit light; 56, a photographing lens for focusing light reflected by an object 3; 57, an electronic flash light-receiving lens; 58, an electronic flash light-receiving element; and 59, a solid-state image pickup device comprising a photosensor section, a vertical transfer section, a memory, and a horizontal transfer section to change an exposure time, i.e., to provide an electronic shutter function. The solid-state image pickup device 59 comprises an FIT-CCD described above. Reference numeral 60 denotes a solid-state image pickup device control circuit for controlling an exposure amount of the solid-state image pickup device 59 in response to a stop signal from a comparator 7. The operation of the camera having the above arrangement will be described below.

Figure 2:
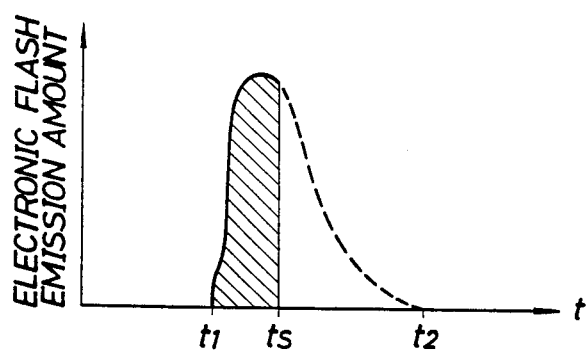
FIG. 2 is a graph showing conversion characteristics of electronic flash emission amounts.
Figure 3:
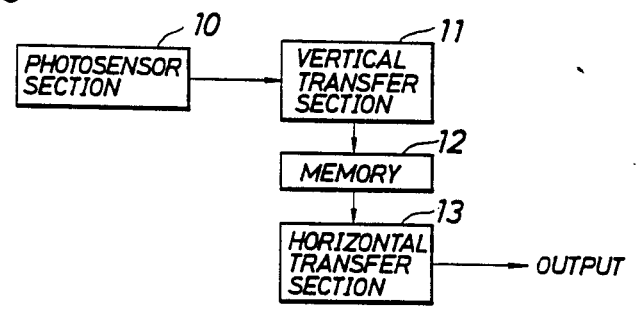
FIG. 3 is a block diagram of an FIT-CCD.
Figure 17:
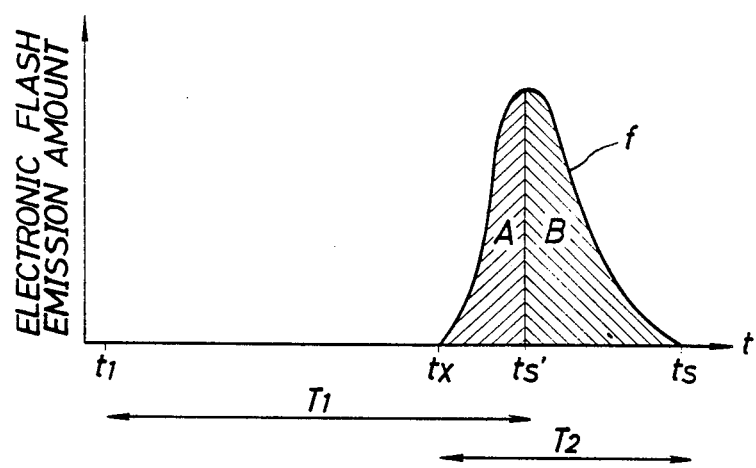
FIGS. 17 to 19 are graphs showing electronic flash emission characteristics in the still video camera according to invention.

The operation will be described with reference to the electronic flash characteristics of FIG. 17 in the same manner as in FIG. 2. A curve f shown in FIG. 17 is an electronic flash emission curve when the electronic flash is operated in a full emission state. According to the present invention, the emission of the electronic flash is started at time tx which advances from time shutter closing time ts by a maximum emission interval T2 (normally, 50 μs to 500 μs) on the basis of a predetermined shutter speed (e.g., 1/60 second corresponding to the interval between time t1 and time ts) in the electronic flash mode (in this case, the emission amount is not controlled and the electronic flash is operated in the full emission state). According to this embodiment, normal light incident on the normal photometric light-receiving element 52 through the normal photometric light-receiving lens 51 is measured by the photometric circuit 53. The CPU 55 determines the f-number and the shutter speed. A signal from the solid-state image pickup device control circuit 60 is supplied to the solid-state image pickup device 59 at time t1, and the charge of the photosensor section 10 (FIG. 3) is transferred to the vertical transfer section. When this transfer operation is completed, an image information receivable state (i.e., the shutter open state) is obtained, and the photosensor section 10 starts exposure, and charging is started.

When a predetermined period of time has elapsed, the light emission circuit 54 receives a trigger signal from the CPU 55 at time tx. Light emission of the electronic flash 2 is started. The object 3 is irradiated with light emitted from the electronic flash 2. Light reflected by the object 3 is incident on the electronic flash light-receiving element 58 through the electronic flash light-receiving lens 57 and on the solid-state image pickup device 59 through the photographing lens 56. Meanwhile, the electronic flash emission amount is abruptly increased, as shown in FIG. 17. At time tx, an integration start signal is input to an integrator 6 in synchronism with generation of the electronic flash emission signal from the CPU 55.

The integrator 6 integrates outputs from the electronic flash light-receiving element 58, and an integrated output is increased as a function of time. When the integrated output reaches a predetermined reference light control level at time ts', the comparator 7 is operated and outputs a stop signal. The stop signal may be output from the CPU 55 through the comparator 7.

When the solid-state image pickup device control circuit 60 receives the stop signal, a shift clock is supplied to the photosensor section 10 (FIG. 3) in the solid-state image pickup device 59 and the charge is transferred to the vertical transfer section 11. The charge of the vertical transfer section 11 can be immediately shifted to the memory 12. Image information of the object 3 in the optimal exposure state is stored in the memory 12. At this time, the integration time of the solid-state image pickup device 59 reaches an interval between time t1 and time ts' and is shorter than the initial set interval (t1 to ts) by (ts−ts'). The shortened interval is very short and condition (ts−t1)>(ts−ts') is established. Therefore, this interval can be neglected. The shutter speed (e.g., 1/60 second, i.e., t1 to ts) in the electronic flash mode is not so long to adversely affect the entire operation.

The electronic flash 2 continuous emits light when time ts' has elapsed. When time ts has reached, the emission of the electronic flash 2 is stopped (i.e., the emission duration of the electronic flash 2 is T2). An interval between time tx and time ts' is given as an actual integration time of the integrator 6. An area A represents an exposure amount corresponding to an image area, integrated on the solid-state image pick-up device 59, and an area B represents an exposure amount which does not contributes to image formation. According to this embodiment, without interruption of electronic flash emission which is very difficult to control, the charge corresponding to the optimal exposure amount can be stored in the memory by utilizing the electronic shutter function Therefore, the electronic flash emission amount can be highly precisely controlled with a simple arrangement.

The concept of exposure control described above can also be applied to a daytime synchronization mode (i.e., when the sun is located behind an object, the electronic flash is operated to obtain a beautiful picture). In this case, the above operation is applicable except that the shutter speed (corresponding to 1/60 second) is changed in accordance with brightness of the object. In this case, when the shutter speed is excessively short, condition (ts−t1)>(ts−ts') cannot be established to adversely affect exposure precision. In this case, a smaller f-number must be selected This operation will be described in more detail. For example, assume that the emission amount immediately reaches the exposure value upon emission of the electronic flash. In other words, assume that a shutter speed error is given as the maximum emission duration of the electronic flash (i.e., ts−ts').

In order to fall the shutter speed error within the range of −0.3 EV (Exposure Value), the following condition must be established:

$$y < (1 - 2^{-0.2})x$$

where y is the electronic flash emission time (ms) and x is the shutter speed (ms) which allows electronic flash photographing. More specifically, the following conditions are established:

(1) Electronic flash emission duration: 517 μs or less for shutter speed of 1/250 sec or less;
(2) Electronic flash emission duration 258 μs or less for shutter speed of 1/500 sec or less; and
(3) Electronic flash emission duration 129 μs or less for shutter speed of 1/1,000 sec or less.

In order to fall the shutter speed error within the range of −0.4 EV, the following condition must be established:

$$y < (1 - 2^{-0.4})x$$

More specifically, the following conditions are established:

(1) Electronic flash emission duration 968 μs or less for 1/250 sec or less;
(2) Electronic flash emission duration 484 μs or less for 1/500 sec or less;
(3) Electronic flash emission duration 242 μs or less for 1/1,000 sec or less; and
(4) Electronic flash emission duration 121 μs or less for 1/2,000 sec or less.

When the shutter speed error is large, an object portion which is irradiated with light from the electronic flash can have an optimal exposure value but an object portion which is not irradiated therewith is over- or under-exposed.

The electronic flash maximum emission duration (50 82 s to 500 μs) need not be fixed but can be set in accordance with distance information from an AF (Auto Focus) system (not shown). For example, if the (object distance)×(f-number) is small, the emission amount can be small. In this case, the interval of (ts−tx) can be estimated to be short. However, if the (object distance)×(f-number) is large, the emission amount is required to be large, and the interval of (ts−tx) is estimated to be long.

Figure 18:
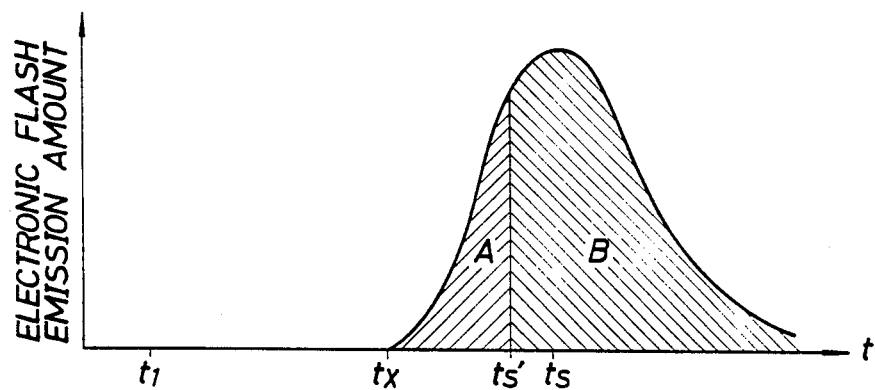
Figure 19:
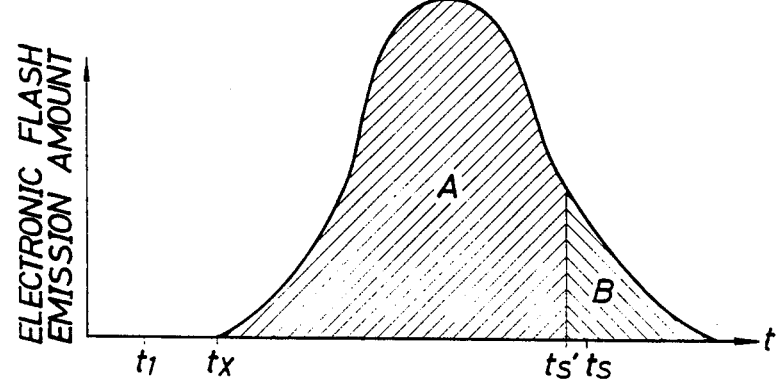

FIG. 18 shows the electronic flash emission characteristics for a small value of the (object distance)×(f-number). FIG. 19 the electronic flash emission characteristics for a large value of the (object distance) x (f-number). As described above, the (object distance)×(f-number) is small, the emission amount can be small. Therefore, the area A can be small, as shown in FIG. 18. However, if the (object distance)×(f-number) is large, the emission amount is required to be large. The area A is large, as shown in FIG. 19.

By using this method, even if the shutter speed is low in the daytime synchronization mode, estimation of the interval of (ts'−tx) allows a decrease in an error as compared with the above case. Therefore, high-speed daytime synchronization can be performed. If time ts' is lagged after time ts, the initially set ts is neglected, and the integration of the solid-state image pickup device continues until time ts', i.e., until the stop signal is output. If the stop signal is not output due to a shortage of the emission amount, although not illustrated, the charge accumulated in the photosensor section is transferred to the vertical CCD at time ts or ts'. In other words, the shutter is closed at time ts or ts'. The charge accumulated in the photosensor unit may be forcibly transferred to the vertical CCD at the shutter speed (e.g., 1/60 second) which is the camera shake limit or the lowest shutter speed (e.g., ¼ second) when a period of time longer than a duration up to time ts or ts' has elapsed.

In this embodiment, the normal and electronic flash photometric light-receiving elements are separately arranged. However, if a photometric switching means for switching the normal light integration and the electronic flash light integration is used, only one light-receiving element is required. The start of integration may be started after the charge of the photosensor section is completely transferred and an image information receivable state is set.

In the above description, the solid-state image pickup device comprises a CCD but is not limited thereto. Other elements may be used to arrange the solid-state image pickup devices. In addition, the solid-state image pickup device capable of varying the exposure time is not limited to the FIT-CCD, but may be replaced with any other element (e.g., a CCD described in Japanese Unexamined Patent Publication (Kokai) No. 60-125082).

Figure 20:
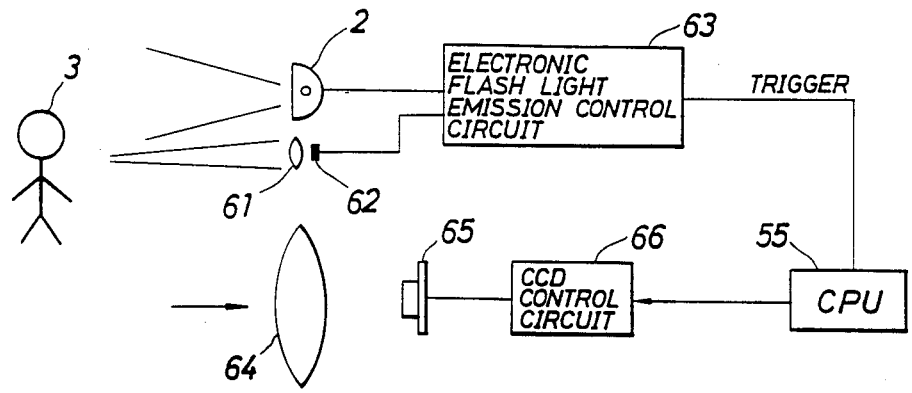
FIG. 20 is a schematic diagram of a still video camera according to still another embodiment of the present invention.

FIG. 20 is a block diagram of a still video camera according to another embodiment of the present invention. Referring to FIG. 20, reference numeral 3 denotes an object; 2, an electronic flash for illuminating the object 3; 61, a lens for focusing light reflected by the object 3; 62, a light control light-receiving element for receiving light transmitted through the lens 61; and 63, an electronic flash emission control circuit for receiving an output from the light-receiving element 62 to control the emission amount of the electronic flash 2.

Figure 5:
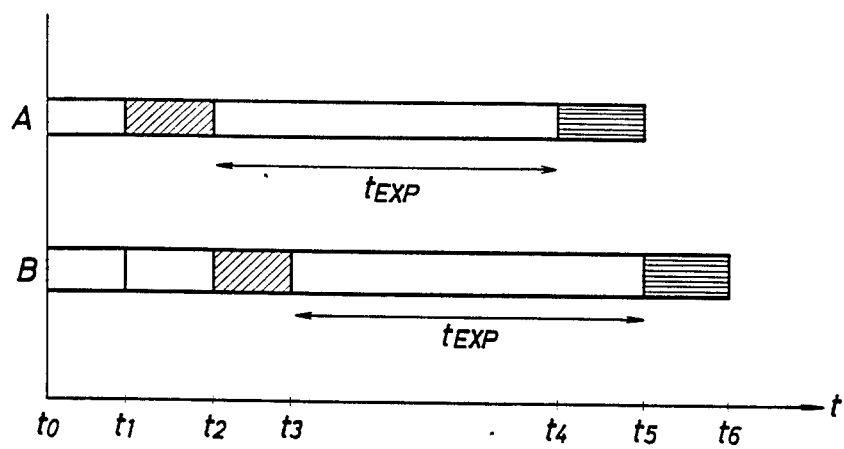
FIG. 5 is a timing chart showing the operation of the still video camera using the FIT-CCD in the frame photographing mode.
Figure 21:
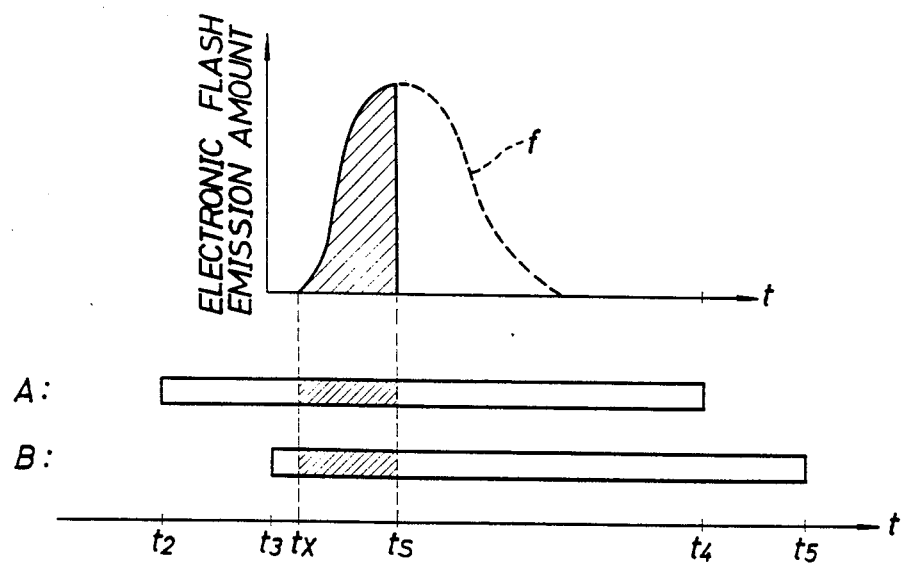
FIG. 21 is a timing chart showing the operation of the still video camera shown in FIG. 20.

Reference numeral 64 denotes a lens for receiving light reflected by the object 3; 65, an FIT-CCD for receiving light transmitted through the lens 64 to perform photographing operations; 66, a CCD control circuit for controlling timings of the FIT-CCD 65; and 55, a CPU for controlling emission timings of the FIT-CCD 65 and the electronic flash 2 and the operation sequence of the still video camera. Control instructions are output from the CPU 55 to the CCD control circuit 66 and the electronic flash emission control circuit 63. The operation of the camera having the above arrangement will be described with reference to the timing chart of FIG. 21. Referring to FIG. 21, A represents the operation of the photosensors for forming the first-field image and B represents the operation of the photosensors for forming the second-field image in the same manner as in FIG. 5. The emission mode of the electronic flash 2 is also illustrated in FIG. 21.

Under the control of the CPU 55, the CCD control circuit 66 supplies a timing signal to the FIT-CCD 65. At time t2, exposure of the odd-numbered photosensors is started. At time t3, exposure of the even-numbered photosensors is started. The CPU 55 supplies a trigger signal to the electronic flash emission control circuit 63 at time tx. Emission of the electronic flash 2 is started.

Light reflected by the object 3 upon emission of the electronic flash is incident on the light control light-receiving element 62 and the FIT-CCD 65 through the focusing lenses 61 and 64. When an integrated value of the light amount of the light control light-receiving element 62 reaches a predetermined light control level at time ts, the electronic flash emission control circuit 63 interrupts emission of the electronic flash 2. As a result, the hatched area is defined as the electronic flash emission amount. The hatched areas A and B are given as light-receiving areas of the photosensors A dotted curve f in FIG. 21 represents the emission characteristics of the electronic flash 2 in the full emission state. According to this embodiment, since the amount of light received by the odd-numbered photosensors is equal to that by the even-numbered photosensors, flickering tends not to occur in reproduction of the image.

In the above embodiment, the photosensor sections are constituted by photosensors arranged in a 4×4 matrix. However, the size of the matrix is not limited to this, but the matrix may include an arbitrary number of photosensors.

The operation of the above embodiment will be described below. This embodiment employs the FIT-CCD, so that a detailed description thereof will be made below.

Figure 22:
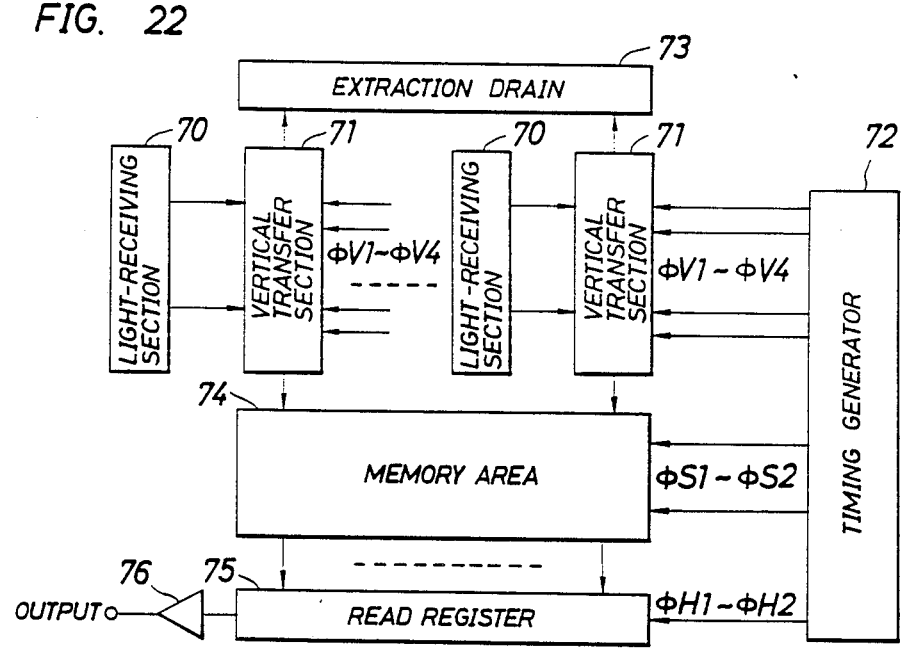
FIG. 22 is a schematic block diagram showing an arrangement of an FIT-CCD.

The FIT-CCD is known as a high-speed solid-state image pickup device and has a memory area. FIG. 22 shows a detailed arrangement of the FIT-CCD. The shutter operation of the FIT-CCD will be described with reference to FIG. 22.

In the FIT-CCD, a plurality of sets each comprising a light-receiving section 70 and a vertical transfer section 71 are arranged. Each of the light-receiving section 70 and the vertical transfer section 71 has a plurality of pixels along its longitudinal direction so that the pixels are arranged in a matrix form.

Charge generated by each light-receiving section 70 is transferred to the corresponding vertical transfer section 71 in response to timing pulses $\phi V1$ to $\phi V4$ generated by a timing generator 72 and is then immediately extracted into an extraction drain 73. The charge (i..e, charge corresponding to light reflected by the object) generated by each light-receiving section 70 is transferred to a memory area 74 through the corresponding vertical transfer section 71. The charge signals are stored in predetermined positions of the memory area 74 in response to timing pulses $\phi S1$ to $\phi S4$ generated by the timing generator 72. The memory area 74 can store one-field image data.

The one-field image data stored in the memory area 74 is shifted to a read register 75 and is sequentially shifted in the horizontal direction by shift clocks $\phi H1$ and $\phi H2$ generated by the timing generator 72. The one-field image data is then amplified and output by an amplifier 76.

As is apparent from the above description, the timings for shifting the charge from the light-receiving sections 70 to the corresponding vertical transfer sections 71 are changed to obtain a variable exposure time. In addition, since the FIT-CCD comprises the memory area 74 for storing the one-field image data, the image of the second field can be recorded while the image data of the first field is output. Therefore, by using the FIT-CCD, the exposure time can be changed in units of fields.

Figure 6:
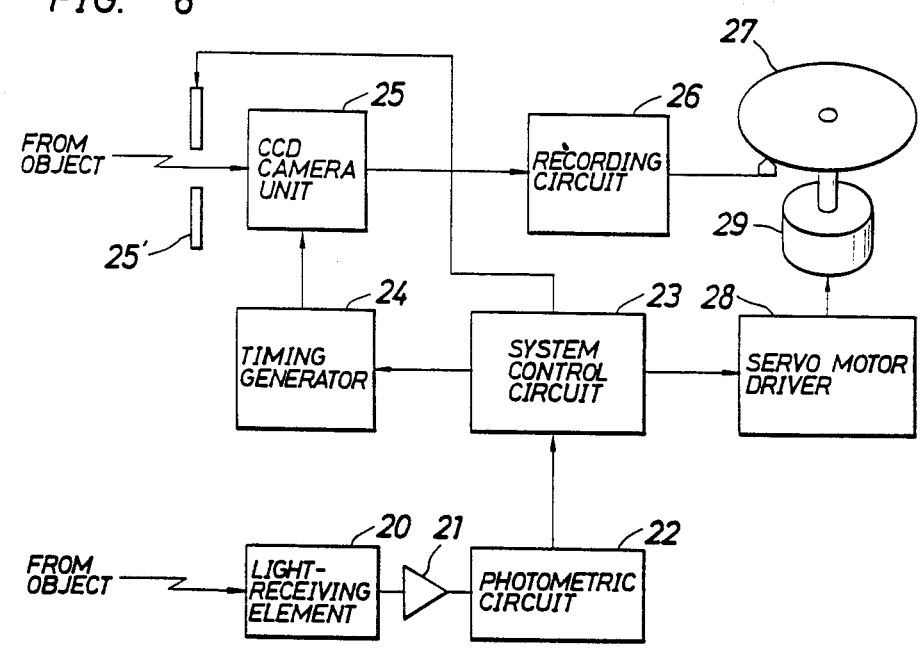
FIG. 6 is a schematic diagram of another conventional still video camera having a photometric circuit.
Figure 23:
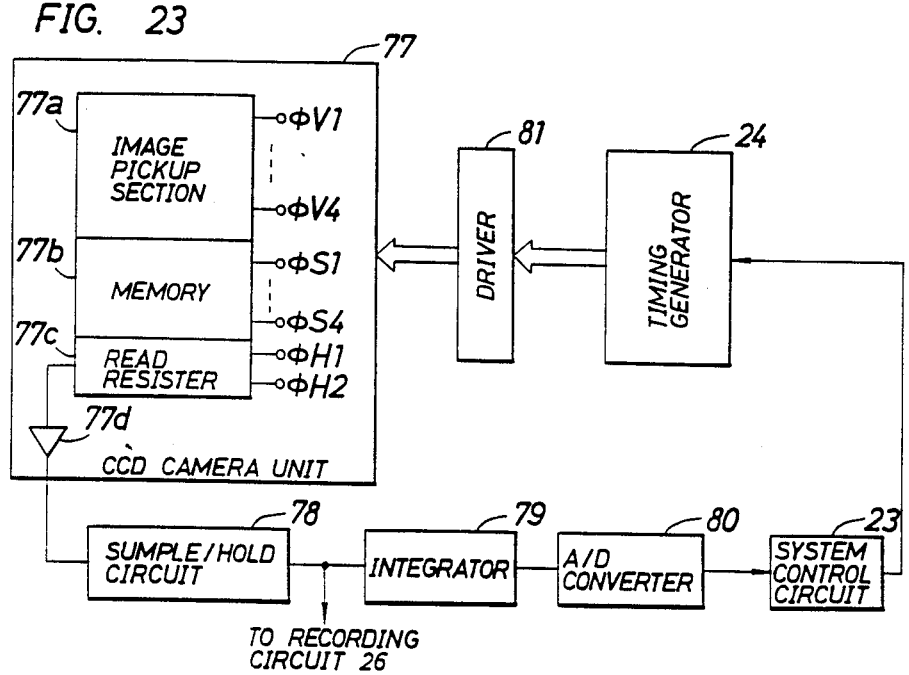
FIG. 23 is a schematic diagram of a still video camera according to still another embodiment of the present invention.

FIG. 23 shows the main part of the still video camera according to still another embodiment of the present invention. The same reference numerals as in FIG. 6 denote the same parts in FIG. 23. Referring to FIG. 23, reference numeral 77 denotes a CCD camera unit using an FIT-CCD as a CCD. The CCD camera unit 77 comprises the FIT-CCD and an amplifier 77d for amplifying an output from the FIT-CCD. The FIT-CCD comprises an image pickup section 77a, a memory 77b, and a read register 77c and is operated in the same manner as in FIG. 21. Reference numeral 78 denotes a sample/hold circuit for sampling/holding an output from the CCD camera unit 77 at high speed. An output (i.e., a video signal) from the sample/hold circuit 78 is supplied to a recording circuit 26 (FIG. 6).

Reference numeral 79 denotes an integrator for integrating an output from the sample/hold circuit 78; and 80, an A/D converter for converting an output from the integrator 79 into digital data. The digital data is supplied to a system control circuit 23. Reference numeral 24 denotes a timing generator for receiving a control signal from the system control circuit 23 and outputting various timing pulses ($\phi V1$ to $\phi V4$, $\phi S1$ to $\phi S4$, $\phi H1$, and $\phi H2$); and 81, a driver for receiving an output from the timing generator 24. An output from the driver 81 is supplied to the FIT-CCD. The operation of the camera having the above arrangement will be described with reference to the timing charts of FIGS. 24A to 24C.

Prior to actual photographing, control signals are supplied from the system control circuit 23 to the timing generator 24 to obtain three shutter times $\Delta t1$, $\Delta t2$, and $\Delta t3$ (wherein $\Delta t1 < \Delta t2 < \Delta t3$). The timing generator 24 outputs charge transfer pulses to the CCD camera unit 77 through the driver 81. As a result, the CCD camera unit 77 generates signal charge corresponding to the given shutter time. An output from the CCD camera unit 77 is input to the sample/hold circuit 78 and is sampled/held thereby at high speed. An output signal from the sample/hold circuit 78 serves as a so-called video signal.

FIG. 24A shows an output (i.e., the video signal) from the sample/hold circuit 78. The video signal is output in units of fields, as shown in FIG. 24A. V1, V2, and V3 in FIG. 24A correspond to shutter times $\Delta t1$, $\Delta t2$, and $\Delta t3$, respectively. It is apparent that the amplitude of the video signal is increased in accordance with the shutter time.

The video signal is input to the recording circuit 26 (FIG. 6) and the integrator 79. The integrator 79 integrates the video signal in units of fields. FIG. 24C shows a waveform of an output from the integrator 79. As is apparent from FIG. 24C, the amplitude of the output from the integrator 79 is increased when the magnitude of the input video signal is increased. S1, S2, and S3 correspond to the video signals V1, V2, and V3, respectively. In the optimal exposure calculation process, the video signal supplied to the recording circuit 26 is neglected.

The A/D converter 80 converts the peak values of the outputs S1 to S3 from the integrator 79 into digital data. The digital data is then supplied to the system control circuit 23. The system control circuit 23 calculates an optimal exposure time Δts so as to obtain an optimal exposure value on the basis of three integrator outputs. When the optimal exposure time (i.e., the shutter time) &ts is obtained, the system control circuit 23 instructs the timing generator 24 to provide the optimal shutter time Δts.

The timing generator 24 supplies a transfer pulse to the CCD camera unit 77 through the driver 81. The CCD camera unit 77 photographs the object for the period corresponding to the shutter time Ats. As a result, the amplitude of a video signal Vs read out from the CCD camera unit 77 and output from the sample/hold circuit 78 becomes optimal, as shown in FIG. 23A. This video signal is supplied to the recording circuit 26 and is subjected to predetermined signal processing. The processed signal is recorded in a magnetic disk 27 (FIG. 6). According to this embodiment, the video signal itself is used for the photometric purpose, high-precision photometry can be performed without using an additional photometric element.

In the above description, the FIT-CCD is exemplified as a solid-state image pickup device which can change the exposure time in units of fields. However, any solid-state image pickup device can be used if it can change the exposure time in units of fields.

FIG. 25 shows the main part of a still video camera according to still another embodiment of the present invention. Reference symbols $D_{11}$ to $D_{mn}$ (where m and n are integers) denote photodiode elements which constitute a light-receiving section (i.e., an image area) The light-receiving section generates charges corresponding to amounts of light received thereby. Reference symbol RV1 denotes a vertical transfer path arranged in correspondence with the column right-receiving elements $D_{11}$ to $D_{m1}$. The vertical transfer path RV1 is constituted by CCDs. Similarly, vertical transfer paths RV2, ... RVn are arranged for the column light-receiving elements $D_{12}$ to $D_{m2}$, ... $D_{1n}$, ... $D_{mn}$, respectively. Reference symbol HCL denotes a horizontal transfer path for transferring the charge transmitted through the vertical transfer paths RV1 to RVn. The horizontal transfer path HCL is constituted by CCDs. Reference symbol BCD denotes a charge extraction section connected to the vertical transfer paths RV1 to RVn; and AMP, a detector for detecting the charge extracted in the charge extraction section BCD. The detector AMP comprises a floating diffusion amplifier (FDA). The solid-state image pickup element according to this embodiment has a characteristic feature lying in that the charge extraction section BCD and the charge detector AMP such as an FDA are arranged.

The operation of the solid-state image pickup device having the arrangement described above will be described below.

In the normal operation mode (image information read mode), the charges generated and stored by the photodiode elements $D_{11}$ to $D_{mn}$ are shifted to the corresponding vertical transfer paths RV and are shifted step by step to the horizontal transfer path HCL in response to clocks $\phi V1$ to $\phi V4$. The horizontal transfer path HCL supplies the charges from the vertical transfer paths RV to the detector DT in units of pixels so that the charges are output outside the device. When the charges are completely output outside the device, the charges in the vertical transfer paths RV are shifted step by step. The above operations are repeated to output the image information from the light-receiving section.

In the photometric operation, charges are transferred from the photodiode elements $D_{11}$ to $D_{mn}$ to the corresponding vertical transfer paths RV, and the charges are extracted to the charge extraction section BCD in the upper portion in FIG. 25 in response to clocks ($\phi V1$ to $\phi V4$) having a speed higher than that in the normal operation mode. The charges extracted to the charge extraction section BCD are detected by the charge detector AMP and are amplified thereby. The amplified signal is output as photometric information.

The charge extraction section BCD is reset by a reset signal applied to reset gates RG arranged for every line or every several lines.

The extraction speed in the charge extraction section BCD is determined by the frequency of the clocks $\phi V1$ to $\phi V4$ applied to the vertical transfer paths RV in the photometric mode. When the frequency of the clocks is increased (e.g., about 1 MHz), the photometric time can be shortened. when the clock frequency is excessively increased, power consumption is undesirably increased. In consideration of the photometric time and the power consumption, the clock frequency can be properly determined. Charge transfer may be performed by in response to one of the clocks $\phi V1$ to $\phi V4$ while the remaining clocks are fixed.

Figure 26:
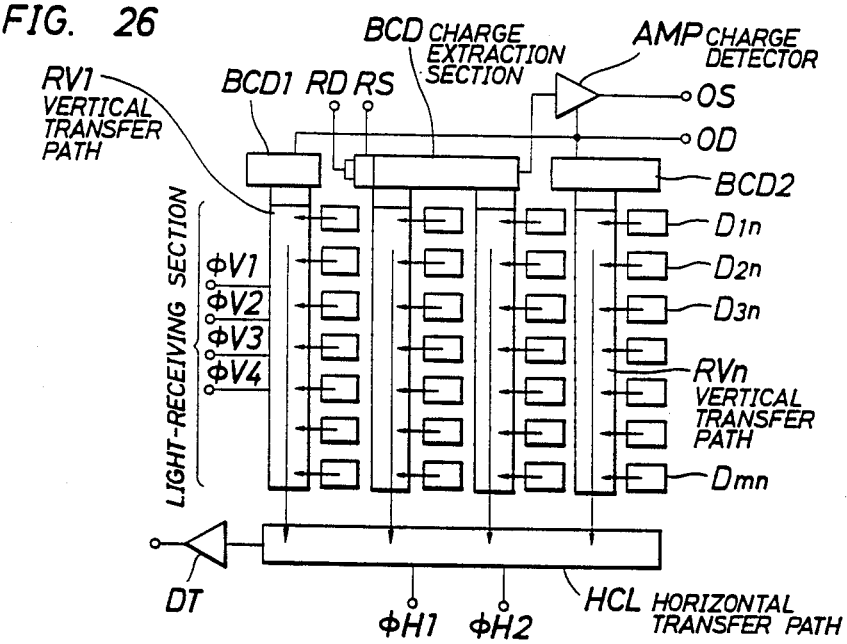
FIGS. 26 to 29 are views showing different solid-state image pickup elements used in the still video camera shown in FIG. 25.
Figure 27:
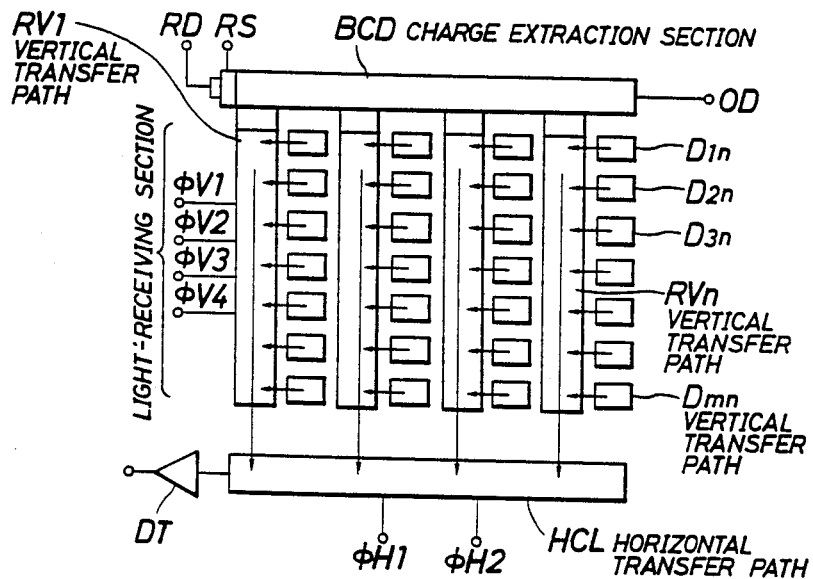

FIGS. 26 and 27 show solid-state image pickup devices according to still other embodiments.

In the arrangement of FIG. 26, a central charge extraction section BCD is connected to several central vertical transfer paths. With this arrangement, the photometric area can be limited to part (the central portion in this case) of the light-receiving section. The vertical transfer paths excluding the central paths are connected to charge extraction sections BCD1 and BCD2. During the photometric operation, the charges are not detected and extracted.

In the arrangement of FIG. 27, the charge detector AMP in the arrangement of FIG. 25 is emitted. A predetermined voltage is applied to a terminal OD (output drain terminal) of a charge extraction section BCD. When the charge is extracted, an amount of current flowing in the charge extraction section BCD is detected, thereby obtaining photometric information In this case, the detector may be reset every several tens of lines. In the reset mode, if an amount of current flowing in a reset drain RD is detected, photometric information in the form of an integrated value for a predetermined area can be obtained.

Figure 28:
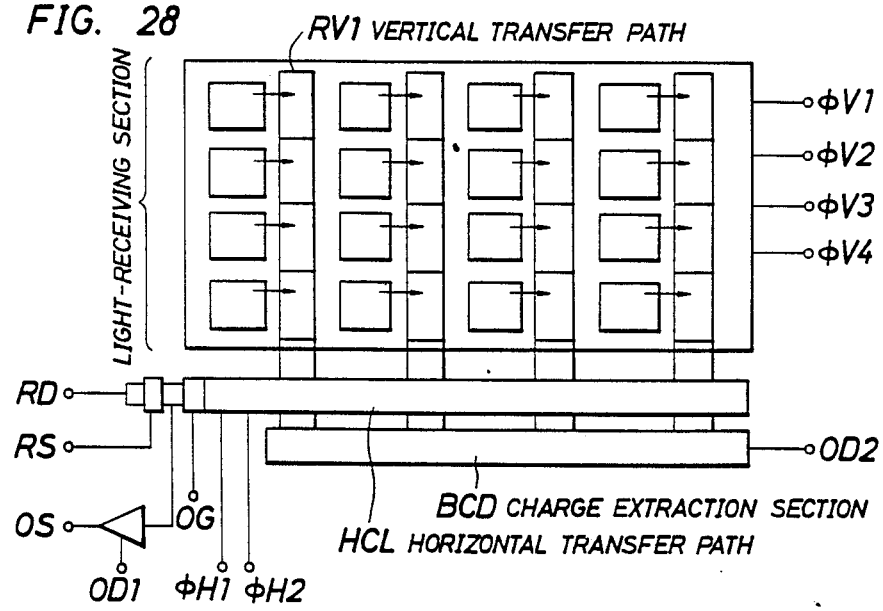
Figure 29:
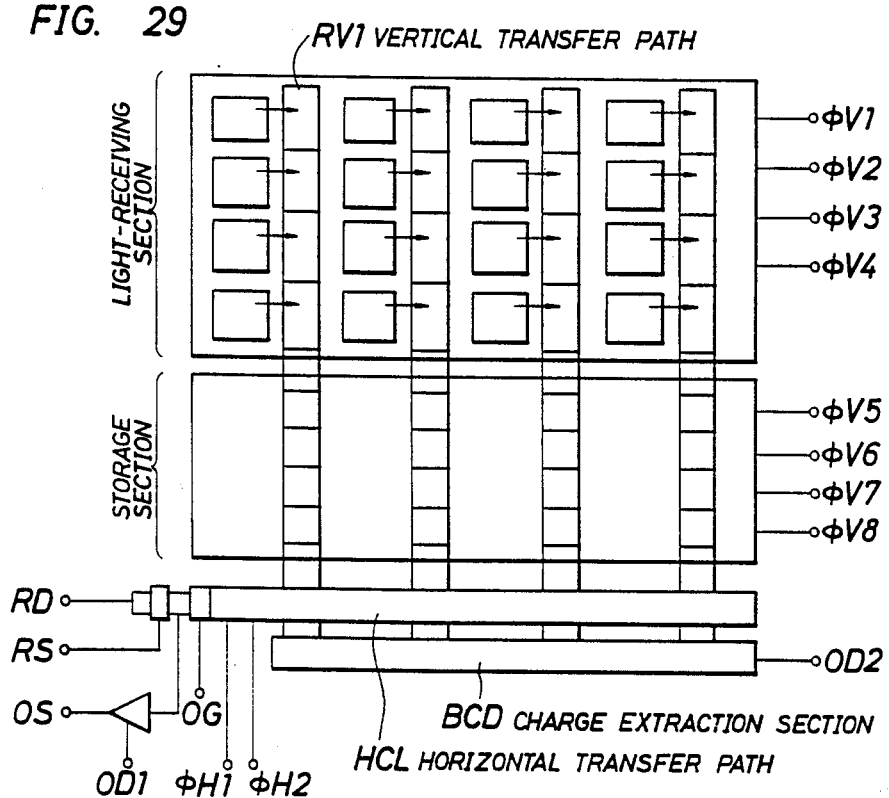

FIGS. 28 and 29 show still other solid-state image pickup devices according to the present invention. A charge extraction section BCD is arranged below a horizontal transfer section HCL in the arrangement of FIG. 27.

The charge is fed downward and is transferred to the charge extraction section BCD through the horizontal transfer section HCL. In the arrangement of FIG. 29, the image sensor is exemplified by an FIT-CCD image sensor.

Figure 7:
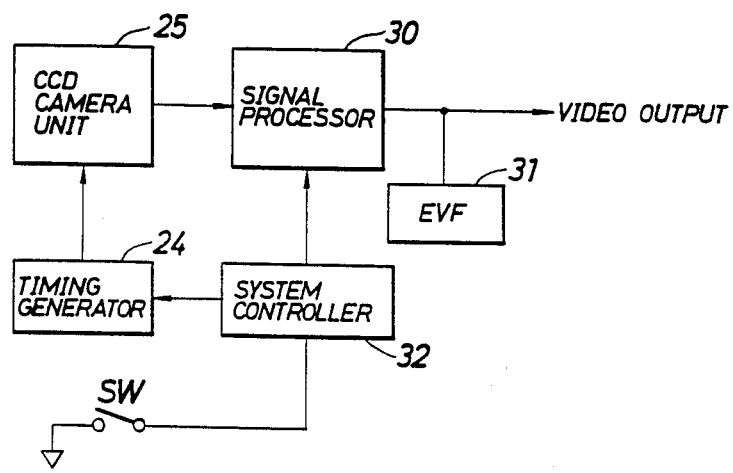
FIG. 7 is a schematic diagram of still another conventional still video camera.
Figure 30:
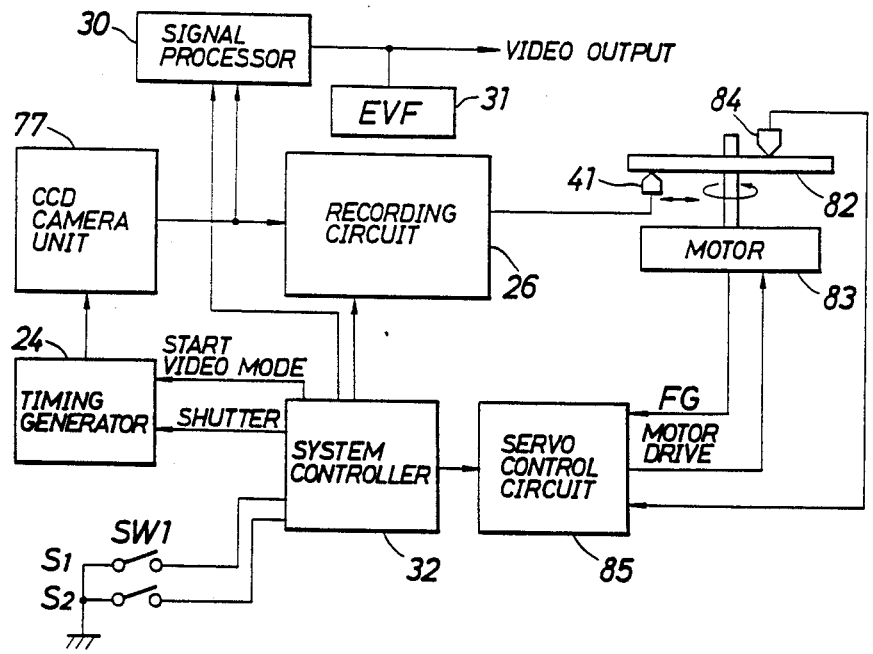
FIG. 30 is a schematic diagram showing a still video camera according to still another embodiment of the present invention.

FIG. 30 is a diagram of a still video camera according to still another embodiment of the present invention. The same reference numerals as in FIG. 7 denote the same parts in FIG. 30. Referring to FIG. 30, reference symbol SW1 denotes a release switch having first and second contacts S1 and S2. When the release switch SW1 is half depressed, the first contact S1 is turned on. When the release switch SW1 is fully depressed, the second contact S2 is turned on. Reference numeral 24 denotes a timing generator for generating various timing pulses for transferring charge to a CCD camera unit 77; and 32, a system controller for receiving a contact signal from the release switch SW1 to supply a video mode start signal and a shutter signal to the timing generator 24 and for controlling the overall operation of the camera. Reference numeral 26 denotes a recording circuit for receiving an output signal from the CCD camera unit 77 under the control of the system controller 32 and for performing recording processing such as color separation, luminance modulation, and the like.

Reference numeral 82 denotes a magnetic disk in which a still image is recorded; 41, a recording head for receiving an output from the recording circuit 26 and recording a modulated image in the magnetic disk 82; and 83, a motor for rotating a magnetic disk 82. The motor 83 comprises, e.g., a servo motor. Reference numeral 84 denotes a PG coil for detecting a start position of a field; and 85, a servo coil circuit for receiving a motor speed signal FG from the motor 83 and position detection signals from the PG coil 84 to control rotation of the motor 83 under the control of the system controller 32. The operation of the camera having the above arrangement will be described below.

Figure 31A:
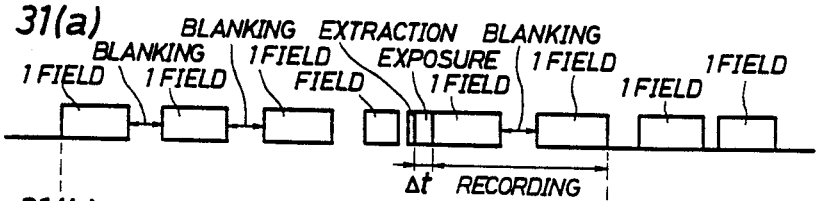
FIGS. 31A to 31C are timing charts showing the operations of the main parts in the still video camera shown in FIG. 30.
Figure 31B:

When the user half depresses the release switch SW1, the first contact S1 is turned on (video mode), as shown in FIG. 31B. When the system controller 32 receives this contact signal, it supplies a video mode start signal to the timing generator 24. When the timing generator 24 receives this video mode start signal, it causes the CCD camera unit 77 to output a video signal (FIG. 31A) by controlling the timing of the charge transfer pulse applied to the CCD camera unit 77. In other words, the video signal is constituted by one-field image data, a blanking period, one-field image data, a blanking period,.... Two field images constitute a one-frame image. Such a video signal is subjected to predetermined signal processing by the signal processor 30. The processed signal is output as a standard video signal This video signal can always be monitored through an electric viewfinder (to be referred to as an EVF hereinafter) 31.

Figure 31C:
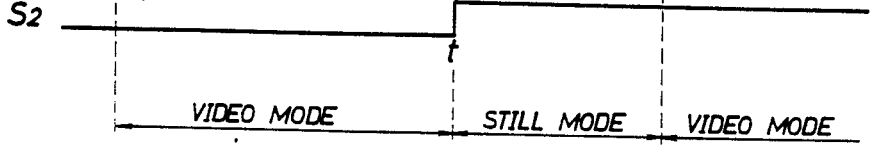

When the camera is used as a normal video camera, the user half depresses the release switch SW1 to obtain a video image. An image is displayed when the camera is connected to the EVF 31 or a television set. When the user wishes to obtain a still image, he fully depresses the release switch SW1. The second contact S2 is turned on (still mode) at time t, as shown in FIG. 31C. When the system controller 32 receives this contact signal, it supplies a shutter signal to the timing generator 24.

When the timing generator 24 receives this shutter signal, it controls the timing of the charge transfer pulse supplied to the CCD camera unit 77. The CCD camera unit 77 serves as an electronic shutter. More specifically, the field charge in the CCD camera unit 77 is extracted, as shown in FIG. 31A and is subjected to exposure for a predetermined period of time $\Delta t$. An extraction time error can be minimized since high-speed operation can be performed and exposure is started within a short period of time upon operation of the contact S2.

When the exposure is completed, the charge generated during the exposure operation is supplied to the recording circuit 26. The recording circuit 26 receives the input signal and performs processing such as color separation, luminance signal modulation, and the like. The processed signal is supplied to the recording head 41. Meanwhile, when the full depression of the release switch SW1 is completed, only the contact S1 is turned on, and the video mode is set again.

When the system controller 32 receives the second contact ON signal, it supplies a recording start signal to the servo control circuit 85. The servo control circuit 85 supplies a drive signal to the motor 83 so as to obtain a detection signal from the PG coil 84, thereby determining the initial position. Thereafter, contact speed control is performed to keep the motor speed signal FG constant Meanwhile, the output from the recording circuit 26 is recorded by the recording head 41 at a predetermined position.

Figure 8A:
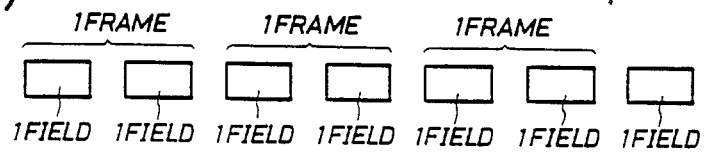
FIGS. 8A to 8C are timing charts showing the operation of the still video camera shown in FIG. 7.
Figure 8B:
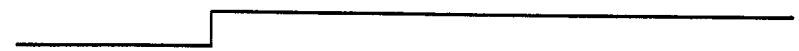
Figure 8C:
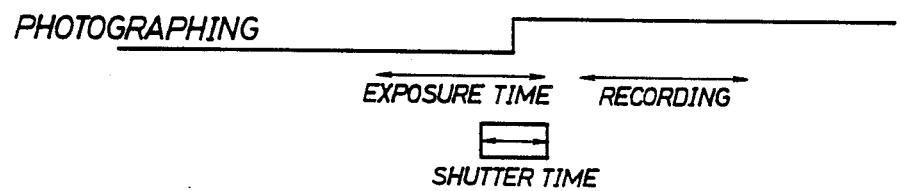
Figure 9:
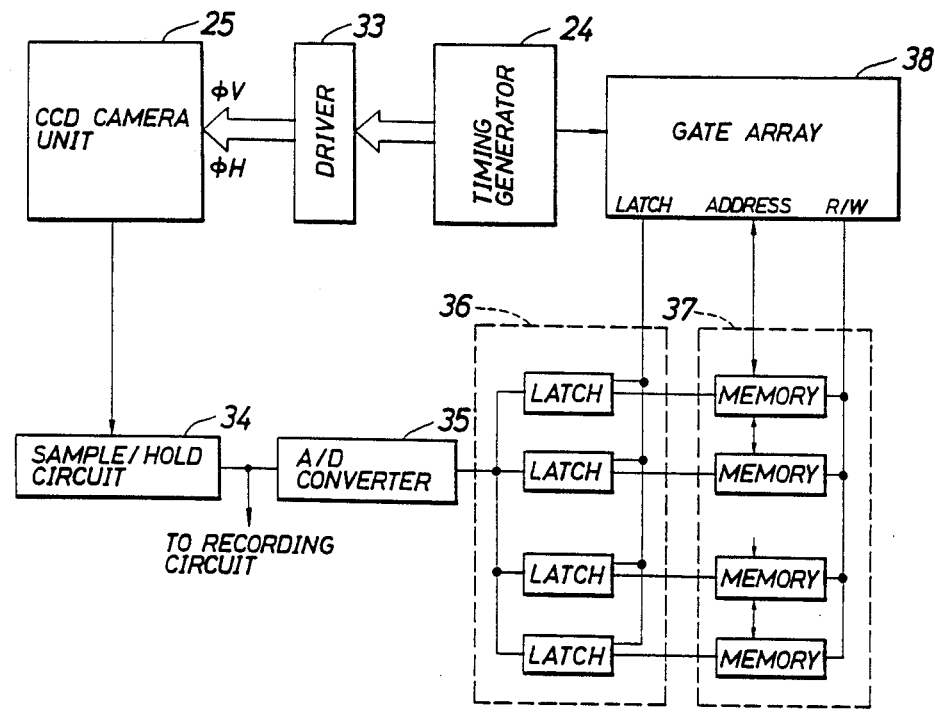
FIG. 9 is a schematic diagram showing still another conventional still video camera having a latch circuit.
Figure 10:
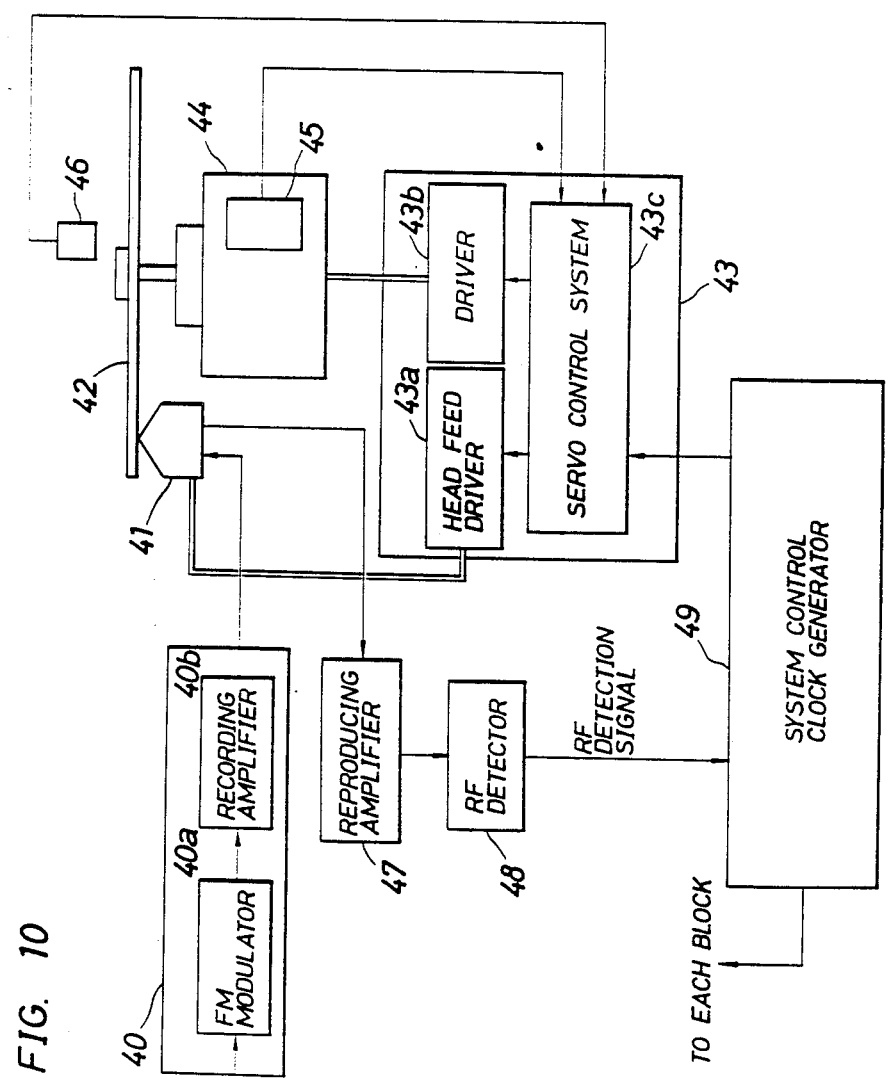
FIG. 10 is a schematic diagram showing still another conventional still video camera.
Figure 14:
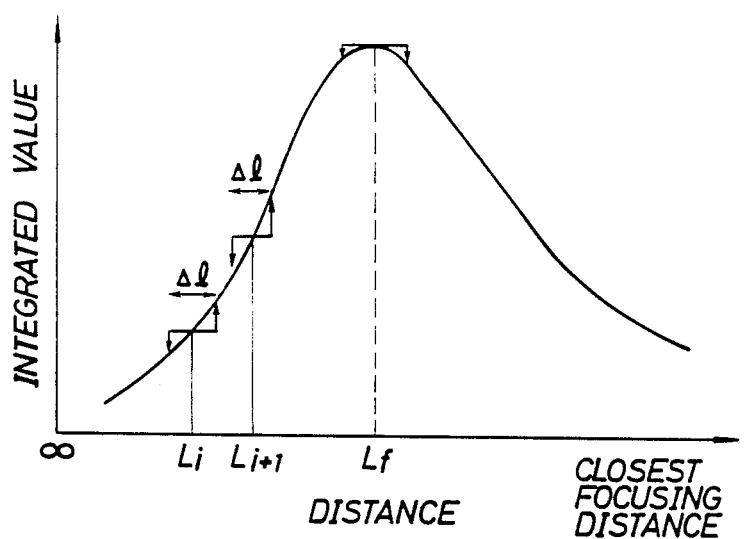
FIG. 14 is a graph for explaining a "climbing" technique as one of the auto focus control techniques.
Figure 15:
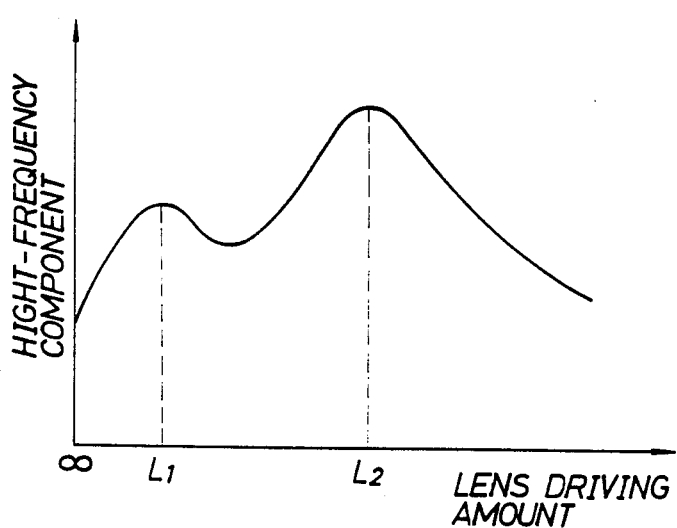
FIG. 15 is a graph for explaining a disadvantage of the "climbing" technique.

In the video mode of the illustrated camera, recording can be performed. In this case, an image obtained by the ON period of the second contact S2 within the one-frame period (1/30 second) is recorded (FIG. 8).

Figure 32:
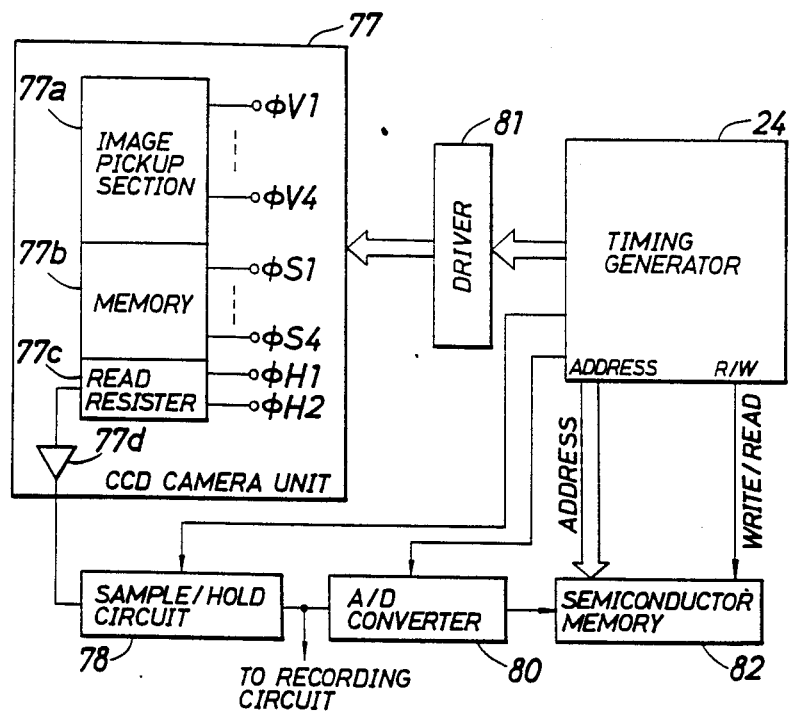
FIG. 32 is a schematic diagram showing a still video camera according to still another embodiment of the present invention.

FIG. 32 shows the main part of a still video camera according to still another embodiment of the present invention. Referring to FIG. 32, reference numeral 77 denotes a CCD camera unit using an FIT-CCD as an image pickup device having an analog memory therein. The CCD camera unit 77 comprises an image pickup section 77a, a memory (corresponding to the analog memory described above) 77b, a read register 77c, and an amplifier 77d for amplifying an image signal output from the read register 77c. The image pickup section 77a, the memory 77b, and the read register 77c constitute the FIT-CCD.

Reference numeral 78 denotes a sample/hold circuit for sampling and then holding an output from the CCD camera unit 77; 80, an A/D converter for converting an output from the sample/hold circuit 78 into digital data; and 82, a semiconductor memory for storing an output from the A/D converter 80.

Reference numeral 24 denotes a timing generator for generating various timing signals; and 81, a driver for transmitting an output from the timing generator 24 to the CCD camera unit 77. The timing generator 24 supplies a sample/hold signal to the sample/hold circuit 78, the start signal to the A/D converter 80, and an address signal and a write/read pulse to the semiconductor memory 82 in addition to signal supply to the CCD camera unit 77.

The signals supplied from the timing generator 24 to the CCD camera unit 77 are the transfer pulses $\phi V1$ to $\phi V4$ supplied to the image pickup section 77a, the address pulses $\phi S1$ to $\phi S4$ supplied to the memory 77b, and read pulses $\phi H1$ and $\phi H2$ supplied to the read register 10c. The operation of the device having the arrangement described above will be described below.

The charge corresponding to brightness is transferred from the image pickup section 77a to the memory 77b in response to pulses $\phi V1$ to $\phi V4$. The charge signals are sequentially stored at addresses accessed in response to the address pulses $\phi S1$ to $\phi S4$ supplied from the timing generator 24. The charge signals stored in the memory 77b as described above are sequentially read out in response to read pulses $\phi H1$ and $\phi H2$ output from the timing generator 24. The readout image signal is amplified by the amplifier 77d and is sampled/held by the sample/hold circuit 78, thereby obtaining a video signal. If necessary, the video signal is supplied to the recording circuit and is subjected to predetermined processing, as has been described with reference to FIG. 8.

An output from the sample/hold circuit 78 is input to the A/D converter 80 and is converted into digital data. The digital image data is written at an address accessed by the address pulses output from the timing generator 24.

Figure 33A:
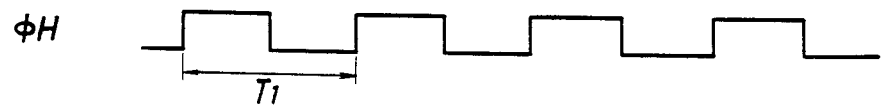
FIGS. 33A and 33B are timing charts showing image data read access in the still video camera (FIG. 32) and the write timing of the memory.
Figure 33B:
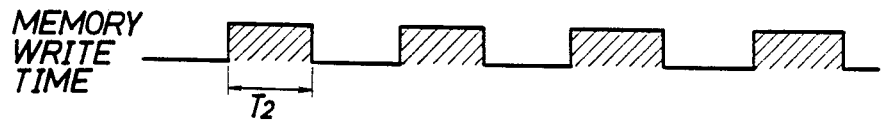

FIGS. 33A and 33B are timing charts of a memory write time determined by the memory write signal and the read pulse $\phi H$ ($\phi H1$ or $\phi H2$) output from the timing generator 24. According to this embodiment, it is easy to establish condition T1>T2 where the T1 is the period of the read pulse and the memory write period T2. Therefore, the latch circuit can be omitted.

The latch circuit is generally arranged due to the following reason. When the period T1 of the read pulse pH is shorter than the memory write period T2, the readout image cannot be processed. At this time, the readout data is temporarily latched and waits for the proper processing timing. In this embodiment, since condition T1>T2 is established, read access of the next image data must be awaited at the end of memory write access. Therefore, the latch can be omitted in principle.

Since the frequency of the output image read out from the CCD camera unit 77 is low, a low-speed A/D converter can be used. As a result, the semiconductor memory dividing gate array and the latch circuit can be omitted, and a compact, lightweight, inexpensive still video camera having low power consumption can be obtained.

In the above description, the FIT-CCD is used as the solid-state image pickup device having an analog memory therein. However, the present invention is not limited to this arrangement. If the image pickup device incorporates an analog memory, the type of device is not limited to the specific one.

Figure 34:
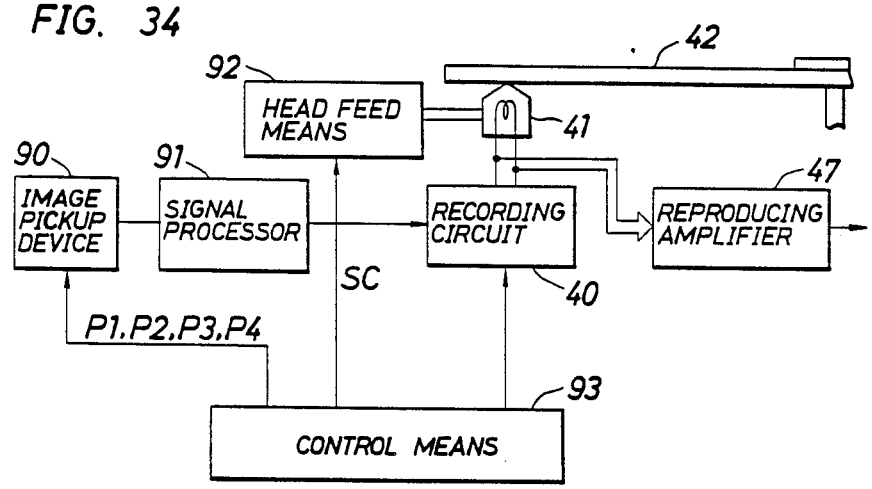
FIG. 34 is a schematic diagram showing a still video camera according to still another embodiment of the present invention.
Figure 35:
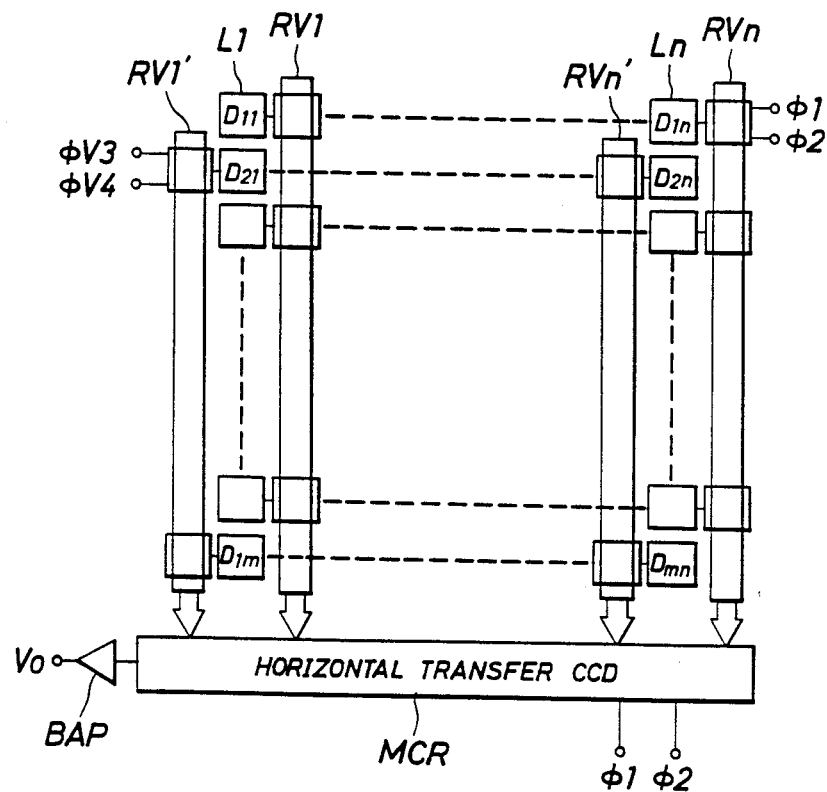
FIG. 35 is a schematic view showing an image pickup in the still video camera shown in FIG. 34; device used in the still video camera shown in FIG. 34.

FIG. 34 is a block diagram of a still video camera according to still another embodiment of the present invention. Referring to FIG. 34, reference numeral 90 denotes an image pickup device capable of performing frame image processing; 91, a signal processor for generating a recording signal input from the image pickup device 90 to a recording circuit 40; 92, a head feed means for feeding a magnetic head 41; and 93, a control means for controlling read access of the recording signal from the image pickup device 90 and the head feed means 92. The magnetic head 41 comprises a single gap head in the system of this embodiment FIG. 35 shows an arrangement of the image pickup device 90 in FIG. 34 (Japanese Unexamined Patent Publication (Kokai) No. 60-125082). Referring to FIG. 35, reference symbols $D_{11}$ to $D_{mn}$ (m and n are integers) denote photodiode elements which constitute a light-receiving section. The photodiode elements $D_{11}$ to $D_{mn}$ generate charge signals corresponding to the amounts of light received thereby, respectively. Reference symbol L1 denotes a light-receiving element array constituted by photodiode elements $D_{11}$, $D_{21}$, . . . $D_{m1}$ arranged in the vertical direction. Similarly, reference symbols L2 to Ln denote light-receiving element arrays; RV1 and RV1' denote two vertical charge transfer CCDs, respectively. The CCD RV1 performs data transfer of the first field, and the CCD RV1' performs data transfer of the second field. Other vertical transfer CCDs are arranged in the same manner as described above. Pairs of vertical transfer CCDs are arranged for each light-receiving element arrays L1, . . . Ln. In the solid-state image pickup device having the structure described above, one system of vertical transfer CCDs is provided for the respective light-receiving element arrays in the conventional system. The CCD of this embodiment has two systems of CCDs. Reference symbol HCR denotes a horizontal CCD register for receiving the output of the first field and then the output of the second field from the two vertical transfer CCDs. An output from the register HCR is extracted as an output VO through a buffer amplifier BAP.

In the solid-state image pickup device having the construction described above, since the field signals from the two vertical transfer CCDs are alternately transferred to the horizontal transfer CCD register HCR, frame image processing can be performed.

FIG. 36 is a timing chart for explaining the operation of the control means 93. P1 represents a control pulse in the image pickup device 90. Charge corresponding to an amount of light received by each light-receiving element is stored in response to the pulse P1. The charge accumulated in the accumulation period TS is instantaneously transferred to the vertical transfer CCDs of the first and second fields in response to a gate pulse P2. Thereafter, the content of the transfer CCD of the first field is sent to the horizontal transfer CCD register HCR in response to a transfer pulse P3. A signal of the first field which is represented by VS1 is supplied to the single gap magnetic head 41 through the recording circuit 40 and is recorded in the magnetic sheet 42. The control means 93 sends a control signal SC to the head feed means 92 to feed the magnetic head 41 by a predetermined distance (i.e., head feed operation). The content of the transfer CCD of the second field is transferred to the horizontal transfer CCD register of the second field in response to a transfer pulse P4. A signal VS2 of the second field is supplied to the magnetic head 41 through the recording circuit 40 and is recorded in the magnetic sheet 42.

The above operations are repeated to cause the single gap head to perform frame recording.

Figure 4:
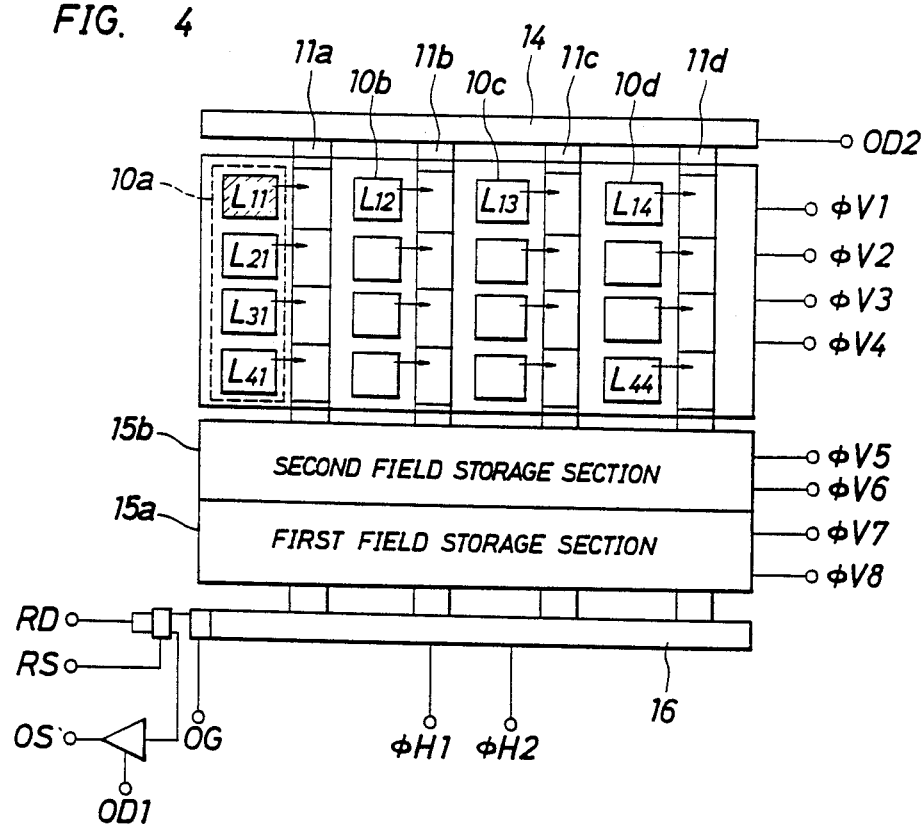
FIG. 4 is a diagram showing the detailed arrangement of the FIT-CCD.

The solid-state image pickup device having the arrangement (FIG. 35) with two storage sections is used as the image pickup device 90 in the above embodiment. However, an FIT-CCD shown in FIG. 4 may be used, or a frame memory may be arranged in, e.g., the recording circuit 40 in place of the arrangement of the above solid-state image pickup device. In this case, the main operations of the control means 93 are summarized as follows.

(1) A one-frame image is stored in a frame memory;

(2) One-field data is read out from the frame memory and is recorded in the magnetic sheet 42 by the single gap head 41;

(3) The head 41 is fed by the head feeding means 92; and (4) Data of the second field is read out from the frame memory and is recorded in the magnetic sheet 42 by the head 41.

The read operations are summarized as follows:

(5) Data of the first field is read out by the single gap head 41 from the magnetic sheet 42;

(6) The readout first-field data is stored in the frame memory;

(7) The magnetic head 41 is moved;

(8) Data of the second field is read out by the magnetic head 41 from the magnetic sheet 42;

(9) The readout second-field data is stored in the frame memory; and

(10) The first- and second-field data are sequentially read out from the frame memory to reproduce the frame image.

In place of the operations (9) and (10), the second-field data and the first-field data read out from the frame memory may be used to immediately reproduce a frame image.

FIG. 37 is a block diagram of a still video camera according to still another embodiment of the present invention. Referring to FIG. 37, reference numeral 3 denotes an object; 94, a focus control lens; and 95, a motor for driving the lens 94 in the scanning directions (directions indicated by a double-headed arrow). Reference numeral 96 denotes an image pickup means for receiving, through the lens 94, light reflected by the object 3; and 97, a video circuit for receiving an output from the image pickup means 96 and performing signal processing. The image pickup means 96 comprises a solid-state image pickup device (e.g., a CCD), an imaging tube or the like. Reference numeral 98 denotes an integrator for receiving an output from the video circuit 97 and integrating a high-frequency component; 99, an A/D converter for converting an output from the integrator 98 into digital data; 100, a CPU for receiving an output from the A/D converter 99 and supplying a control signal to the motor 95; 101, a ROM; and 102, a RAM. The operation of the camera having the arrangement described above will be described below.

Figure 38:
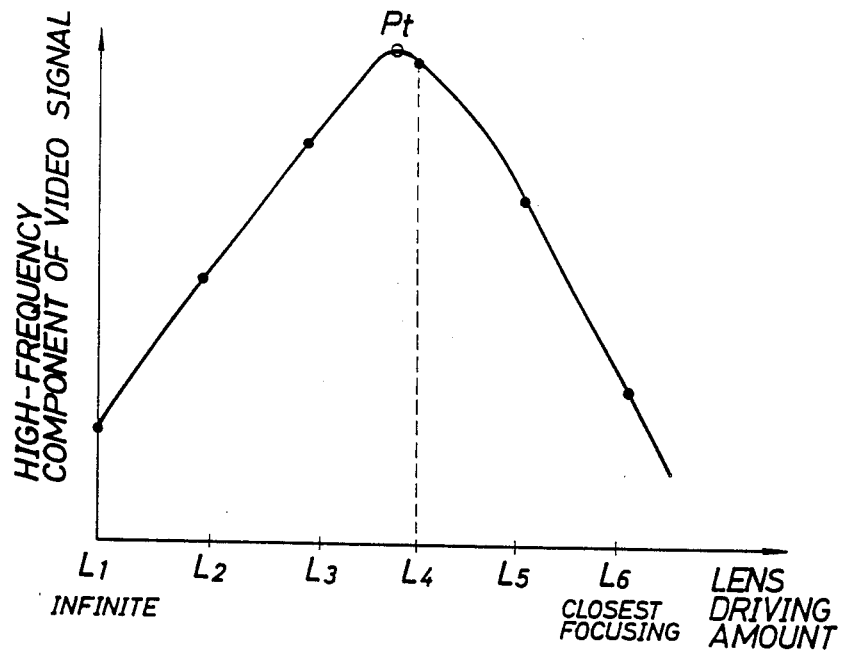
FIG. 38 is a graph showing characteristics of the high-frequency component integrated values of the video signal.

The operation of this embodiment will be described with reference to characteristics of integrated values of high-frequency components of the video signal, as shown in FIG. 38. The integrated values of the high-frequency components of the video signal are plotted along the ordinate, and the lens driving amounts are plotted along the abscissa. L1 corresponds to the infinite (∞), and L6 corresponds to the closest focusing distance. The lens 94 is set at a position L1 corresponding to the infinite distance. A high-frequency component of an output from the image pickup means 96 is supplied to the integrator 98 through the video circuit 97. The integrator 98 integrates one-frame data or its part as an output from the image pickup means 96. The A/D converter 99 converts the output from the integrator 98 into digital data. The digital data is supplied to the CPU 100. The CPU 100 stores the output from the A/D converter 99 in the RAM 102.

The CPU 100 sends a control signal to the motor 95 to drive the lens 94 to the position L2. The same operations as described above are repeated The CPU 100 drives the lens 94 to the position L6 while the above operations are repeated Integrated values of the high-frequency components at the respective points are obtained, and the results are stored in the RAM 102 (step ①).

Scanning from the infinite distance position L1 to the closest focusing distance position L6 is completed, the high-frequency component integrated data (six data at points or positions L1 to L6 in this case) stored in the RAM 102 are read out by the CPU 100, and the CPU 100 finds maximum value. If the maximum value is found, the position (L4 in this case) corresponding to the maximum value is defined as an in-focus position. When the object 3 is actually photographed, the lens 94 is moved to the position L4 and photographing is performed (step ②). The photographed image is magnetically stored in a 2" floppy disk (not shown) in a still video camera.

When photographing is completed, the CPU 100 returns the lens 94 to the initial position and prepares for the next photographing cycle (step ③).

Figure 39:
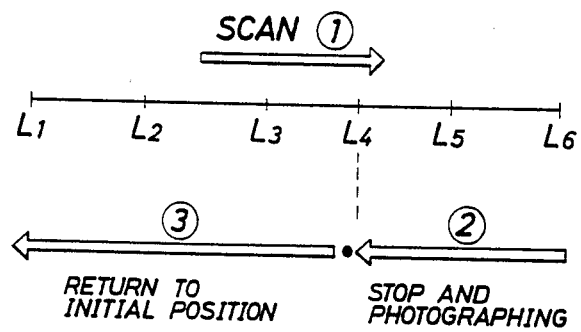
FIG. 39 is a chart showing the operation sequence of the still video camera shown in FIG. 37.

FIG. 39 shows the operation sequence of the present invention. Step ① to step ③ correspond to step ① to step ③ described above, respectively.

In the above description, the position L4 is given as the in-focus position However, a true peak value Pt is actually slightly deviated from the position L4, as shown in FIG. 38. In this case, the position of the lens 94 is finely adjusted in order to obtain an accurate peak position. Data at point L4 and data obtained by driving the lens in the forward and reverse directions are used to perform an interpolation. Therefore, the true peak value Pt can be obtained Data at the points L3, L4, and L5 can be arithmetically calculated for interpolation.

Figure 40:
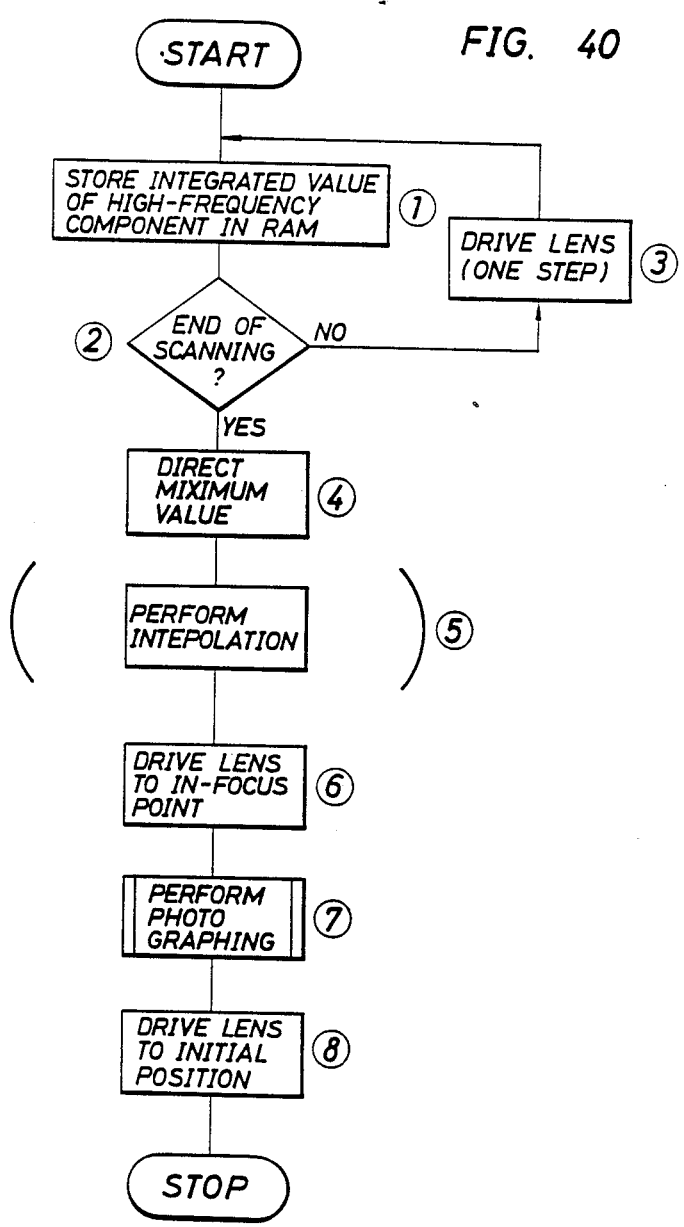
FIG. 40 is a flow chart showing the operation of the still video camera shown in FIG. 37.

FIG. 40 is a flow chart for explaining the operation of the camera shown in FIG. 37. The detailed operation of the camera has been described above The operation of the camera will be briefly described below. The integrated values of the high-frequency components are calculated and stored in the RAM 102 (①). The CPU checks if all scanning operations have been completed (②). If NO in step ②, the lens is driven by one step (③).

When all the scanning operations have completed, a maximum value of the integrated values of the high-frequency components is detected (④). Interpolation operations are performed as needed, and a true maximum value is detected (⑤). Thereafter, the lens is moved to the in-focus point (⑥), and photographing is performed (⑦). When photographing is completed, the lens is moved to the initial position (⑧), and the next photographing cycle is initiated.

What is claimed is:

1. A focusing apparatus for a still video camera for taking a still video image, the apparatus comprising:
   image pickup means for generating an image signal in response to light incident thereon;
   lens means for forming an image on the image pickup means, said lens means being capable of moving from a position of a closest focusing distance to a position of an infinite focusing distance;
   integrating means for integrating a plurality of high frequency components of the image signal at respective ones of a plurality of steps as the lens means moves between the position of closest focusing distance to the position of infinite focusing distance prior to taking a still video image; and
   determining means for determining the in-focus position of the lens means on the basis of the integrated values of the high-frequency components of the image signal by interpolating from the integrated values of the high-frequency components of the image signal at the plurality of steps of the lens means to determine a maximum value, the maximum value of the high frequency component of the image signal corresponding to the in-focus position of the lens means, said lens means being moved to said in-focus position.

2. A focusing apparatus as claimed in claim 1, wherein the image pickup means comprises a solid-state pickup device.

3. A focusing apparatus as claimed in claim 1, further including means for moving the lens means to the position of the lens means where the integrated value of the high frequency component of the image signal is interpolated to be a maximum.

4. A focusing apparatus as claimed in claim 3, in which the moving means is adapted to move the lens means to the in-focus position.

* * * * *